United States Patent
Wang

(10) Patent No.: US 10,324,262 B1
(45) Date of Patent: Jun. 18, 2019

(54) FIELD TERMINABLE FIBER OPTIC CONNECTORS

(71) Applicant: Wei Min Wang, Portola Valley, CA (US)

(72) Inventor: Wei Min Wang, Portola Valley, CA (US)

( * ) Notice: Subject to any disclaimer, the term of this patent is extended or adjusted under 35 U.S.C. 154(b) by 0 days.

(21) Appl. No.: 15/835,294

(22) Filed: Dec. 7, 2017

(51) Int. Cl.
  *G02B 6/38* (2006.01)

(52) U.S. Cl.
  CPC ......... *G02B 6/3803* (2013.01); *G02B 6/3806* (2013.01); *G02B 6/3846* (2013.01); *G02B 6/3862* (2013.01); *G02B 6/3879* (2013.01); *G02B 6/3821* (2013.01)

(58) Field of Classification Search
  CPC .. G02B 6/3803; G02B 6/3806; G02B 6/3846; G02B 6/3862; G02B 6/3879; G02B 6/3887
  See application file for complete search history.

(56) References Cited

U.S. PATENT DOCUMENTS

| | | | |
|---|---|---|---|
| 3,914,015 A | 10/1975 | McCartney | |
| 3,989,567 A | 11/1976 | Tardy | |
| 4,009,931 A | 3/1977 | Malsby et al. | |
| 4,047,796 A | 9/1977 | Kao et al. | |
| 4,050,781 A * | 9/1977 | Beauhaire | G02B 6/3809 385/64 |
| 4,056,305 A | 11/1977 | McCartney et al. | |
| 4,093,341 A | 6/1978 | Crick | |
| 4,123,139 A | 10/1978 | Sandahl | |
| 4,217,029 A | 8/1980 | Kao | |
| 4,223,976 A | 9/1980 | Zangiacomi et al. | |
| 4,378,145 A | 3/1983 | Stancati et al. | |
| 4,460,243 A | 7/1984 | Strait, Jr. | |
| 4,486,072 A | 12/1984 | Roberts | |
| 4,490,007 A | 12/1984 | Murata | |
| 4,506,946 A | 3/1985 | Hodge | |

(Continued)

FOREIGN PATENT DOCUMENTS

| CN | 102057308 B | 10/2013 |
|---|---|---|
| EP | 1960815 | 9/2015 |

(Continued)

OTHER PUBLICATIONS

Jeff Hecht, Understanding Fiber Optics (5th edition, revised), Chapter 13 entitled Connectors and Splices; pp. 299-325; Laser Light Press, ISBN: 1511445653 (2015).

*Primary Examiner* — Daniel Petkovsek
(74) *Attorney, Agent, or Firm* — Fish IP Law, LLP

(57) ABSTRACT

An assembly for splicing first and second optical fibers is contemplated. The assembly typically comprises a splicing member disposed within a barrel member. A first optical fiber can be inserted through a first end of the barrel member, and a second optical fiber can be inserted through a second end of the barrel member to splice ends of the first and second optical fibers in the splicing member. A recess at the second end of the barrel can be used to lock the second optical cable, and a clamping member can be used to hold the second optical fiber. An optical fiber stub holder can couple the first end of the barrel member and an optical fiber stub from which the first optical fiber extends. Thus, the first and second optical fibers can be effectively secured in a splicing relationship using the assembly.

19 Claims, 16 Drawing Sheets

(56) References Cited

U.S. PATENT DOCUMENTS

| | | | |
|---|---|---|---|
| 4,575,182 A | | 3/1986 | Hensel et al. |
| 4,676,589 A | | 6/1987 | Miyashita et al. |
| 4,730,892 A | * | 3/1988 | Anderson ............ G02B 6/3636 385/65 |
| 5,018,821 A | * | 5/1991 | Kurata ................. G02B 6/3835 385/72 |
| 5,341,448 A | * | 8/1994 | Huebscher .......... G02B 6/3809 385/68 |
| 5,469,522 A | * | 11/1995 | Fan ...................... G02B 6/3801 385/72 |
| 6,018,606 A | | 1/2000 | Sogabe et al. |
| 7,270,487 B2 | * | 9/2007 | Billman ............... G02B 6/3846 385/55 |
| 7,556,438 B2 | | 7/2009 | Oike et al. |
| 7,628,549 B2 | * | 12/2009 | Takahashi ........... G02B 6/3846 385/86 |
| 7,883,275 B2 | | 2/2011 | Wang |
| 8,070,367 B2 | | 12/2011 | Winberg et al. |
| 8,439,577 B2 | | 5/2013 | Jenkins |
| 8,573,859 B2 | | 11/2013 | Larson et al. |
| 8,840,320 B2 | | 9/2014 | Park et al. |
| 9,016,953 B2 | | 4/2015 | Ott et al. |
| 9,151,905 B2 | | 10/2015 | Bauco et al. |
| 9,411,101 B2 | | 8/2016 | Takahashi et al. |
| 2010/0215321 A1 | | 8/2010 | Jenkins |
| 2014/0363130 A1 | | 12/2014 | Park et al. |

FOREIGN PATENT DOCUMENTS

| | | |
|---|---|---|
| WO | 2013126429 | 8/2013 |
| WO | 2016095213 | 6/2016 |

\* cited by examiner

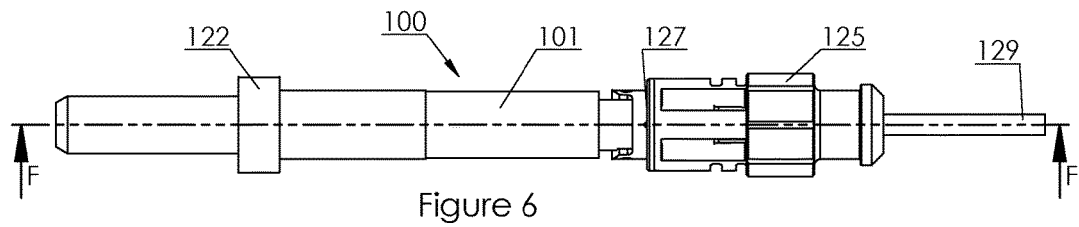
Figure 6
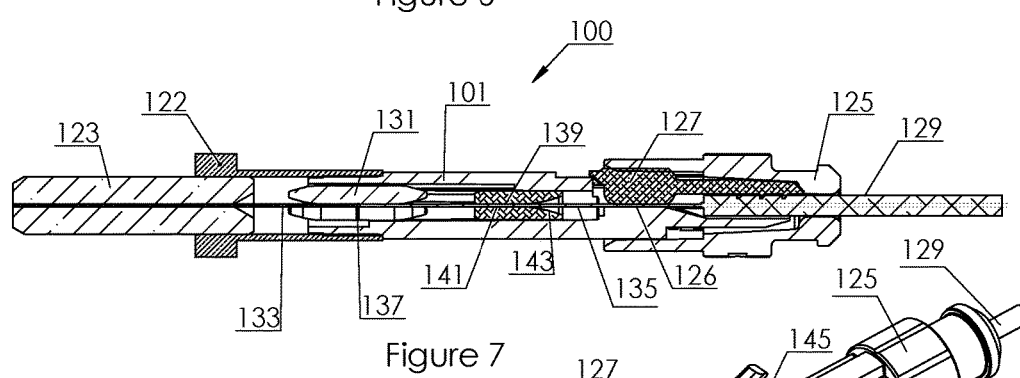
Figure 7
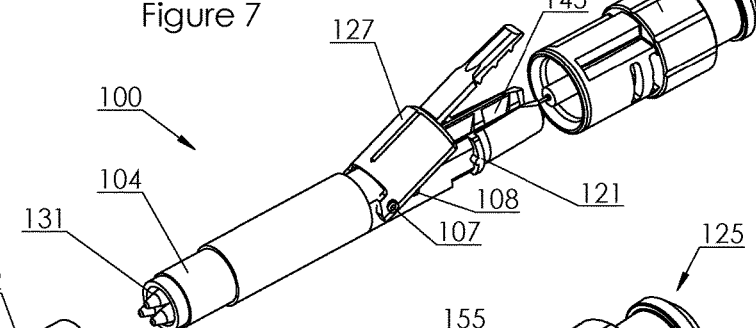
Figure 8
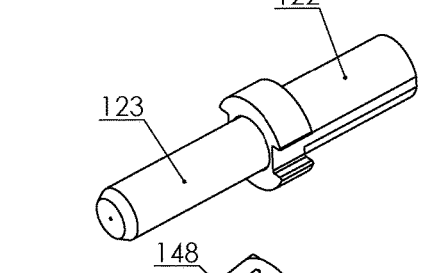
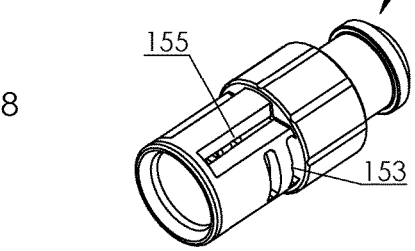
Figure 10A
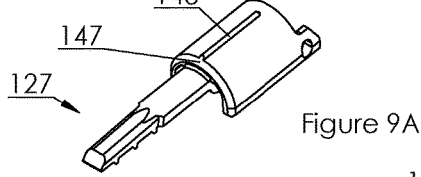
Figure 9A
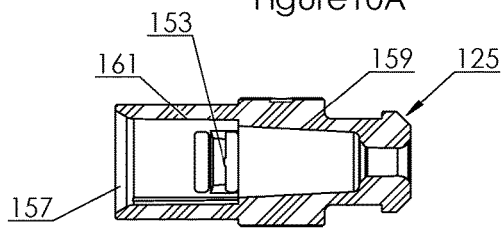
Figure 9B
Figure 10B

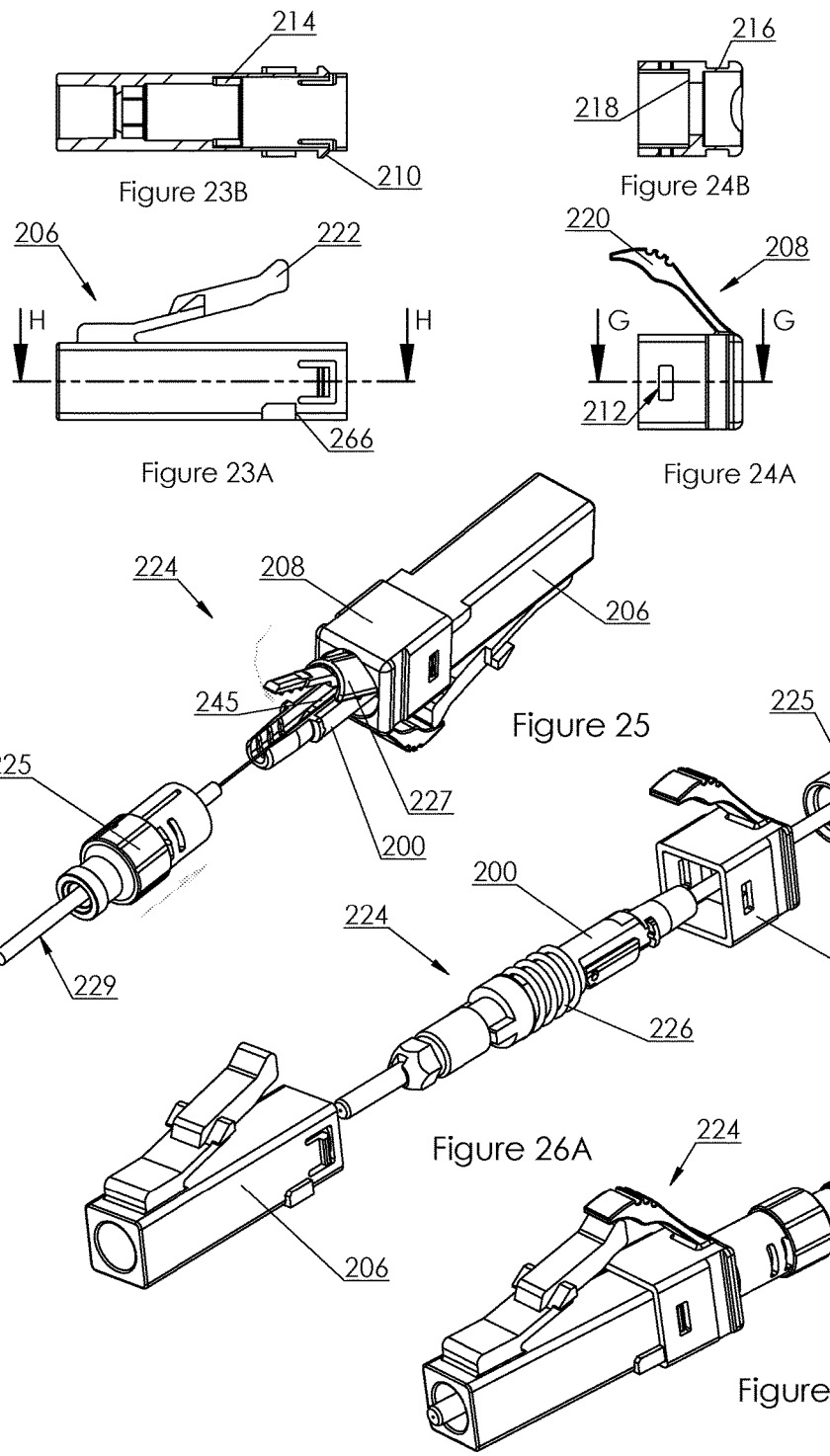

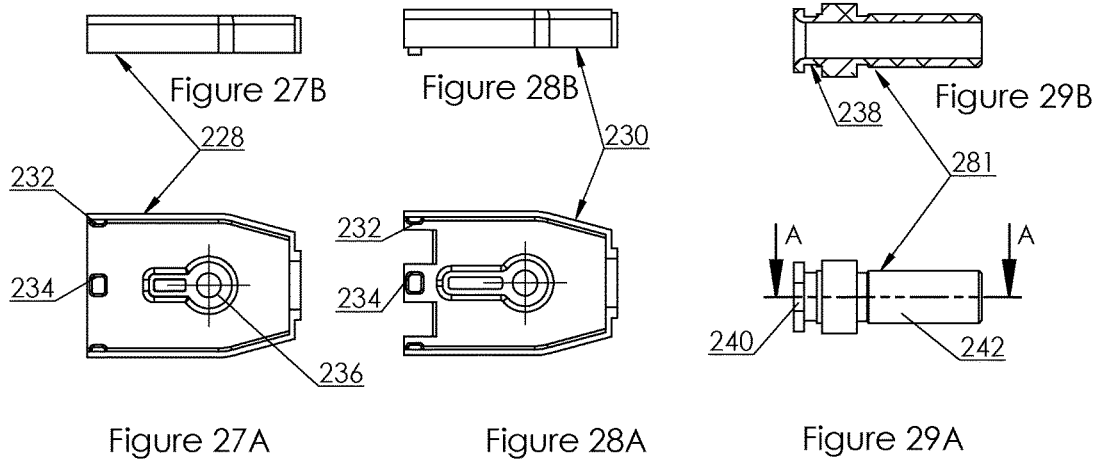
Figure 27B   Figure 28B   Figure 29B
Figure 27A   Figure 28A   Figure 29A
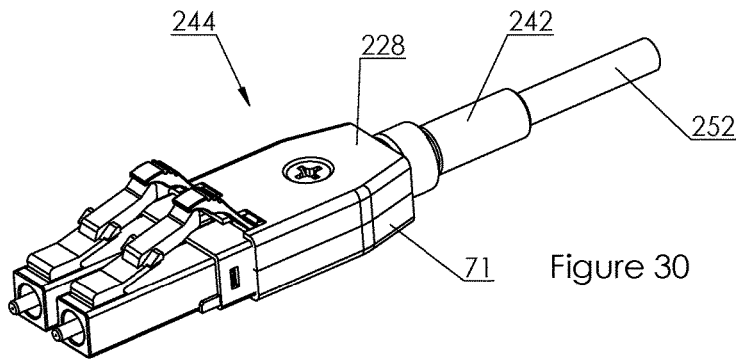
Figure 30
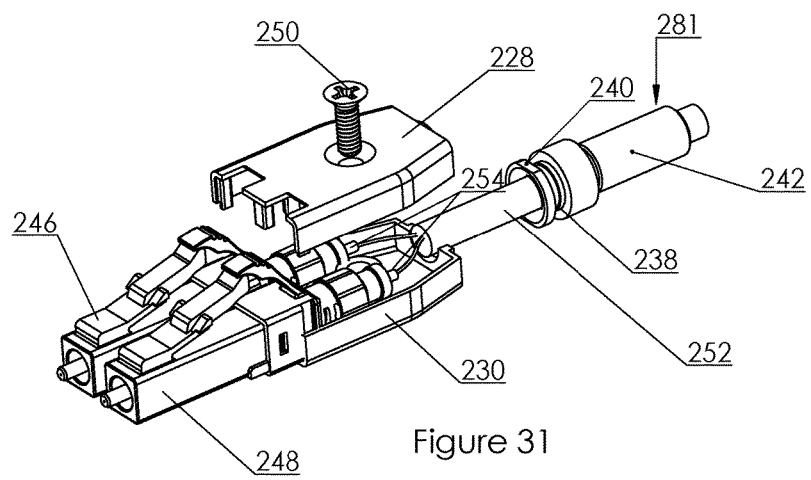
Figure 31

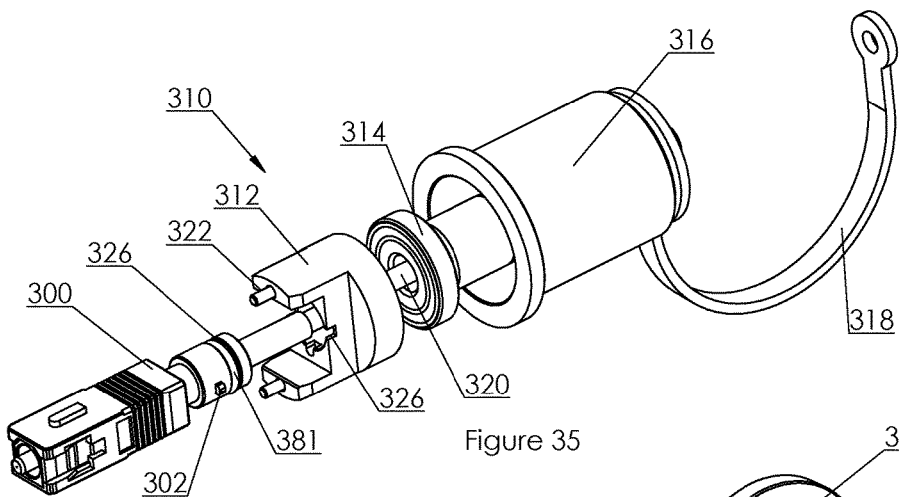
Figure 35
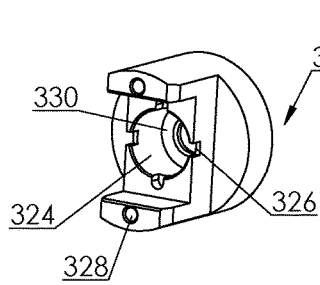
Figure 36A
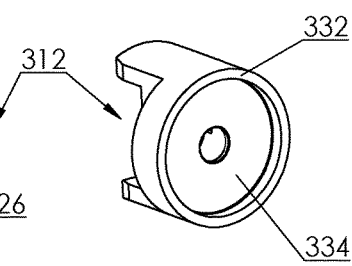
Figure 36B
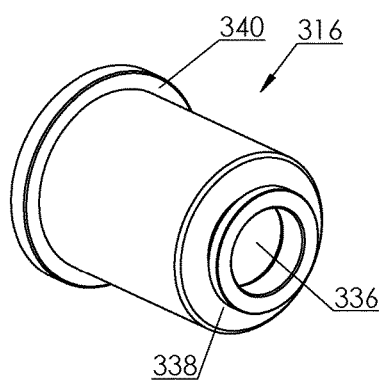
Figure 37
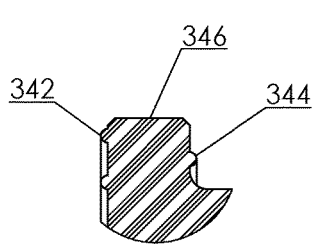
Figure 38C
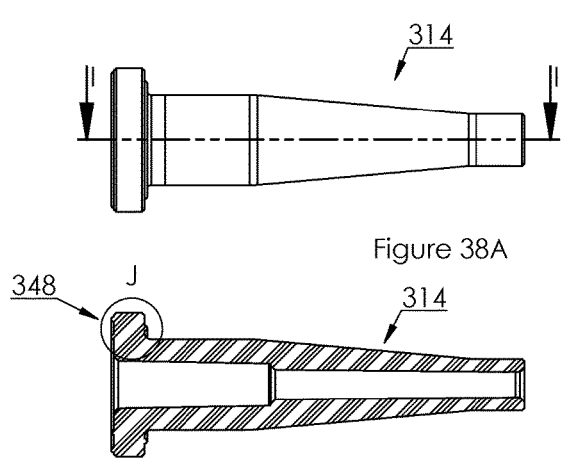
Figure 38A
Figure 38B

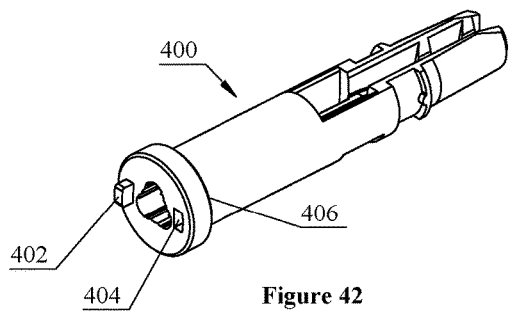
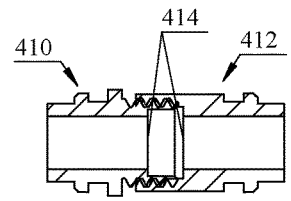
Figure 43A
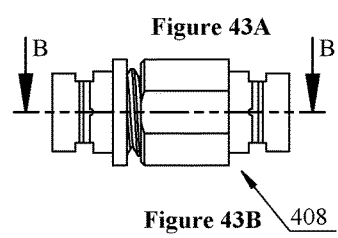
Figure 43B
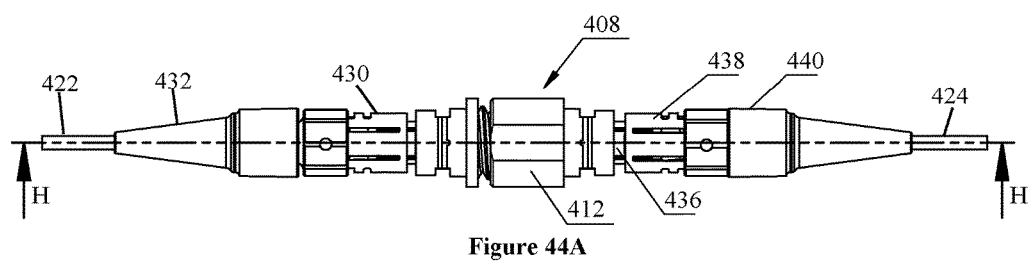
Figure 44A
Figure 44B
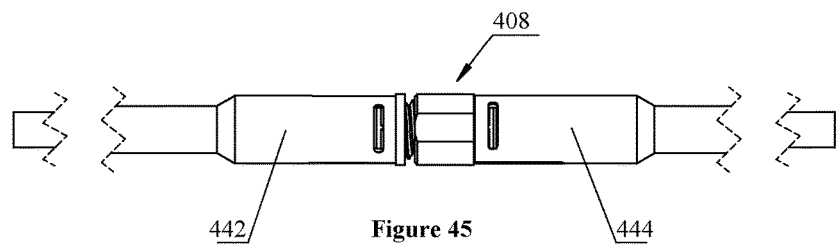
Figure 45

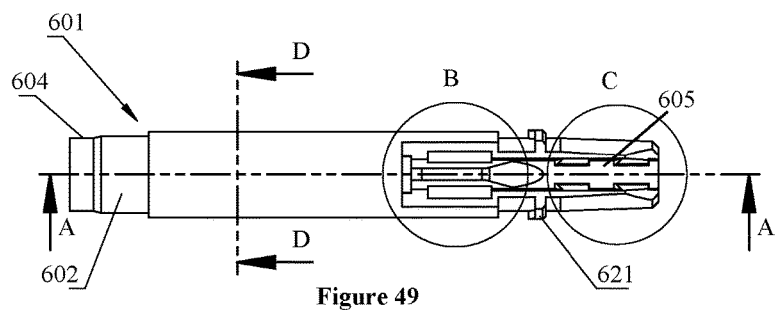
Figure 49
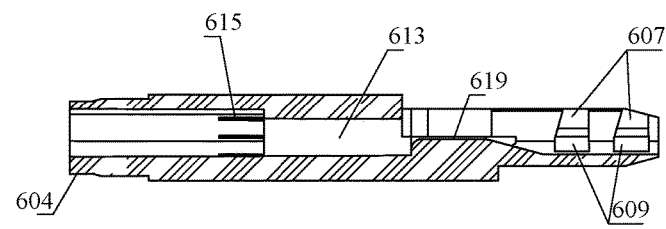
Figure 50
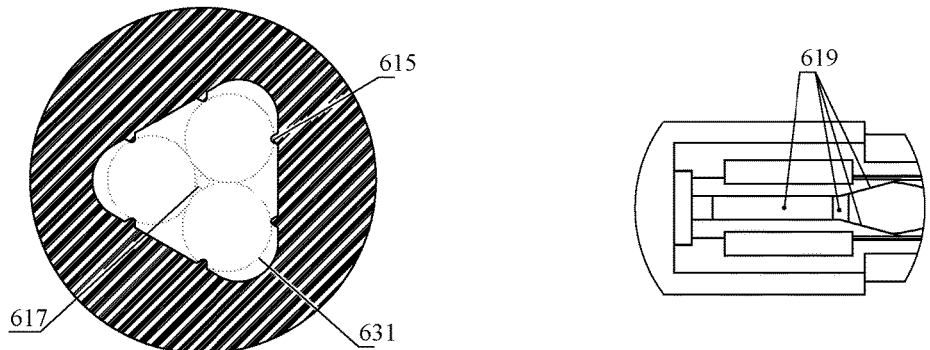
Figure 51
Figure 52
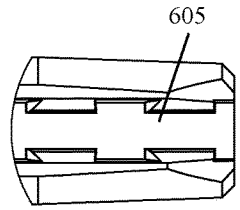
Figure 53

FIELD TERMINABLE FIBER OPTIC CONNECTORS

FIELD OF THE INVENTION

The field of the invention is an assembly for splicing first and second optical fibers.

BACKGROUND

The background description includes information that may be useful in understanding the present invention. It is not an admission that any of the information provided herein is prior art or relevant to the presently claimed invention, or that any publication specifically or implicitly referenced is prior art.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Optical fiber splicing is used to join ends of two optical fibers in a firm connection in order to couple optical power from one optical fiber to other optical with minimum or no power loss. One approach for joining two optical fiber ends is mechanical splicing. A mechanical splice is used to join two optical fiber ends by abutting the ends fixed within a structure. Although mechanical splicing joins two optical fiber ends, it is difficult to achieve splicing with low signal light loss due to several factors. For example, some of the factors that produce losses in mechanical splicing are lateral displacement of abutting fiber cores, misalignment of fiber axes (i.e., angular misalignment of the fiber ends), differences in the numerical aperture between the fibers, fiber glass cracking and/or debris between the fiber ends, reflections at fiber ends, surface finishes on the fiber ends, and mechanical and environmental stresses induced factors mentioned previously on the optical fiber itself.

The design of the structure containing the mechanical splice (e.g., a barrel assembly or other housing structure) is critical in preventing losses. Both fibers should be assembled along a precise center line with minimum deviation or separation in order to assure minimum optical insertion loss during splicing. A poorly designed structure will result in bad optical splicing installation and product field operation performance against mechanical and environmental stresses.

Most field terminable connectors rely on a very precise V or U groove to guide two fiber ends to abut one another, and the fiber ends are fixed in position with the help of a press plate. Due to the manufacturing tolerances and distortion caused by press plate actuation forces, these types of splicing members are difficult to create a precise enough aperture for optical fiber splicing that is positioned along a precise center line. Consequently, splicing performance suffers and micro or macro bending is introduced in the system after an optical fiber and a fiber stub are locked in place. Typically, many components are needed in this type of splicing mechanism which further increases the risk of insertion losses due to (i) splicing components being over constrained and offset from component center line, and (ii) micro or macro bending induced. Furthermore, many field terminable connectors require an installation platform to ensure that the optical fiber is abutting the fiber stub before both are locked in place. Consequently, extra equipment may be needed at various job sites if an installation platform is required.

Various optical fiber connectors have been contemplated without installation platform. For example, Park (U.S. Pat. No. 8,840,320) describes an optical fiber connector having a splicing element. The connector comprises a ferrule having an optical fiber stub that is spliced with a bare fiber from a field optical fiber cable. The two fiber ends abut one another within the splicing element, and are locked in place by attaching a cap to the splicing element. The locked splicing element floats within a backbone having a clamping portion to clamp the field optical fiber cable. During installation, the field optical fiber is inserted into the backbone until a coated portion of the field optical fiber cable begins to bow/bend, and the field optical cable is locked to the backbone prior to the cap being applied to lock the splicing element. It is necessary for this design to form cable bowing/bending in order to provide mechanical compliance during connector mating/un-mating to mitigate the undesired losses. Consequently, the movement of cable bowing during numerous mating/un-mating actions will affect splice element reliability.

Various optical fiber connectors have been contemplated without V or U groove in splicing element. Wang (U.S. Pat. No. 7,883,275) describes a fiber optics connector having a 3-rod bundle used to splice a fiber stub and an optical fiber of a field fiber optic cable. The 3-rod bundle is assembled in accordance with Soddy Circle geometry to create an aperture that receives the fiber stub and the bare fiber. Other 3-rod bundles for mechanical splicing have been described by Tardy (U.S. Pat. No. 3,989,567) and Kao (U.S. Pat. No. 4,047,796). However, due to the difficulty to pack a 3-rod bundle, such rods can deform when brought together to create a 3-rod bundle. Additionally, manufacturing the rods of a harder material can be expensive and economically undesirable for production of 3-rod bundles.

Thus, there is still a need in the art for improved field installable optical fiber mechanical splicing connectors with minimum installation tool while providing a robust performance design.

SUMMARY OF THE INVENTION

The inventive subject matter provides apparatus, systems, and methods in which first and second optical fibers are spliced. For example, an assembly for splicing first and second optical fibers is contemplated. As used herein, the term "optical fiber" refers to a bare optical fiber. The assembly comprises a barrel member, a splicing member, a cap and a clamp. The splicing member is disposed and typically locked within the barrel member, and defines an aperture having dimensions that aligns ends of the first and second optical fibers at a junction. The clamp is disposed directly about the second optical fiber at a position distal from the junction to thereby lock the second optical fiber in place. It is contemplated that prior to clamping the optical fiber, an optical cable jacket holding feature (e.g., a tapered recess) on the barrel is used to hold the jacket of second optical fiber to maintain contact of the second optical fiber in the splicing member so an extra tool to hold fiber ends of first and second optical fibers abut prior to clamping the second fiber will not be necessary. The first optical fiber can be a bare fiber that is directly or indirectly coupled to an end of the barrel member. For example, the bare fiber can extend from an optical fiber stub (also referred to as an optical fiber ferrule) that directly couples with an end of the barrel member. In another example, the bare fiber can extend from an optical fiber stub, which is received by an optical stub fiber holder (also referred to as an optical fiber holder) that connects the optical fiber stub to an end of the barrel member. The optical fiber stub holder can be a special designed connector flange. The second optical fiber can be a field optical fiber from a field optical fiber cable.

In some embodiments, the aperture of the splicing section can be defined by a first rod, a second rod, and a third rod that abut one another. At least one projection on an interior surface of the barrel member can abut at least one of the first rod, the second rod, and the third rod so that the rods abut one another to form the aperture of the splicing section without excessive interference and friction. Advantageously, the rods will not deform and distort the aperture of the splicing section, which often occurs when the rods are subject to excessive interference and friction during assembly. In some embodiments, the aperture of the splicing section can be defined by a lumen of a splicing member. In some embodiments, it is contemplated that an optical fiber stub holder can simultaneously couple with a splicing member and an optical fiber stub holding the first optical fiber to thereby hold the splicing member and optical fiber stub together as one integral assembly.

The clamp comprises a surface of the barrel member and a surface of a separate clamping member. Typically, a cap has a cavity with dimensions to receive each of (a) at least a portion of the clamping member and (b) at least a portion the barrel member to thereby bias the surface of the separate clamping member toward the surface of the barrel member. In some embodiments, the barrel member comprises an opening disposed above the second surface, and dimensioned to receive the clamping member. The cap may comprise a slot that mates with a projection that extends from an exterior surface of the barrel member to provide mechanical compliance.

The assembly can further include a guiding member disposed between the splicing member and the clamp. The guiding member defines a lumen having dimensions that guide the second optical fiber to the splicing member with minimum damage to the end face of the second optical fiber that faces the first optical fiber. It is contemplated that the guiding member can be integrated in a splicing member, such that the splicing member defines a lumen that is used to guide a second optical fiber to a first optical fiber. The barrel member can comprise a U or V grooved surface disposed adjacent to the guiding member.

The first optical fiber can be a bare fiber that extends from an optical fiber stub (e.g., an optical fiber stub having a pre-polished connector stub end face on one end and a bare fiber extending from the other end) which is press fit in an optical fiber stub holder and the second optical fiber can be a field optical fiber from a field optical fiber cable. It is contemplated that the optical fiber stub holder can be (i) made of metal and/or (ii) press fit with an end of the barrel member to thereby provide good mechanical holding strength. Additionally, the optical fiber stub holder can press fit with the end of the barrel member to compress the end of the barrel member and rods disposed in the barrel and thereby cause the rods to abut each other. In embodiments comprising a splicing ferrule, it is contemplated that the press fit provided by the optical fiber stub holder to the end of the barrel member may or may not cause the inner diameter of the barrel to contact the splicing ferrule. In some embodiments, the barrel member further comprises a tapered recess on a second end that is dimensioned to hold a portion of an optical fiber cable (e.g., a coating or jacket of a field optical fiber cable) of the second optical fiber. The cap that locks the clamping member also comprises snap fit features to lock itself on the second end of barrel and prevent field optical fiber slip off from tapered recess. It is contemplated that a cap can be configured to hold a cable boot to provide strain relief for the second optical cable.

In another aspect, an assembly for splicing first and second optical fibers is contemplated. The assembly comprises a barrel member, a splicing member, and a guiding member. The splicing member is disposed within the barrel member, and defines an aperture having dimensions that align ends of the first and second optical fibers at a junction. The guiding member is disposed adjacent to the splicing member, and defines a lumen that is coaxial with the aperture to guide the second optical fiber to the aperture. It is contemplated that the lumen of the guiding member is tapered, and has a smallest diameter that is dimensioned to guide the second optical fiber into an opening of the splice member without damage the end face of the second optical fiber.

In yet another aspect, an assembly for splicing a first optical fiber and a second optical fiber is contemplated. The assembly comprises a barrel member, a splicing member, and a clamp. The splicing member is disposed within the barrel member, and is configured to splice the first optical fiber and the second optical fiber. The clamp is disposed directly about the second optical fiber at a position distal from the junction. Typically, the assembly further comprises a cap having a cavity with dimensions to receive each of (a) at least a portion of a clamping member of the clamp and (b) at least a portion the barrel member to thereby bias a surface of the clamping member toward a surface of the barrel member.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 6 is a top view of an embodiment of an assembly having the barrel member of FIG. 1, a splicing member, a guiding member, an optical fiber and fiber holder assembly, a clamping member, and a cap.

FIG. 7 is a cross-sectional view of the assembly of FIG. 6 along the line F-F.

FIG. 8 is an exploded view of the assembly of FIG. 6.

FIGS. 9A-9B are perspective views of the clamping member of FIG. 6.

FIGS. 10A-10B a perspective view and a cross-section view of the cap of FIG. 6.

FIGS. 23A and 23B are a side view and a cross-sectional view along line H-H of an embodiment of a front housing of an LC connector.

FIGS. 24A and 24B are a side view and cross-sectional view along line G-G of an embodiment of a backbone housing of an LC connector.

FIG. 25 is a perspective view of an embodiment of an LC connector comprising the assembly of FIGS. 22A and 22B, front housing of FIGS. 23A-B, the backbone housing of FIGS. 24A-B, and a cap with an optical field cable.

FIG. 26A is an exploded view and FIG. 26B is a perspective view of the final assembly of the LC connector of FIG. 25.

FIGS. 27A and 27B are a top view and a side view of an embodiment of an embodiment of a lower clamshell housing of an LC duplex package.

FIGS. 28A and 28B are a bottom view and a side view of an embodiment of an upper clamshell housing of an LC duplex package.

FIGS. 29A and 29B are a top view and a cross-sectional view along the line A-A of an embodiment of a crimp sleeve of an LC duplex package.

FIG. 30 is a perspective view of an embodiment of an LC duplex package having two LC connectors of FIG. 25.

FIG. 31 is an exploded view of the LC duplex package of FIG. 30.

FIG. 35 is an exploded view of the field terminable SC connector and hardened crimp sleeve of FIG. 32 with an embodiment of a hardened jumper cable.

FIGS. 36A and 36B are a front view and rear view of the SC hardened backbone of FIG. 35.

FIG. 37 is a perspective view of the hardened connector seal cap of FIG. 35.

FIGS. 38A-38C are top view, a cross-sectional view along the line I-I, and an enlarged view of area "J" of the hardened cable boot of FIG. 35.

FIG. 42 is a perspective view of an embodiment of a half barrel member of a mechanical splicer.

FIGS. 43A and 43B are a top view and a cross-sectional view along the line B-B of an embodiment of left and right backbones of a mechanical splicer used to join the half barrel member of FIG. 42 with a second half barrel member.

FIGS. 44A and 44B are a top view and a cross-section view along the line H-H of the mechanical splicer having the half barrel member of FIG. 42, a second half barrel member, and the left and right backbones of FIGS. 43A-43B.

FIG. 45 is a top view of an embodiment of a mechanical splicer with medium or heavy duty field fiber optical cables.

FIG. 49 is a top view of another embodiment of a barrel member.

FIG. 50 is a cross-sectional view of the barrel member of FIG. 49 along the line A-A.

FIG. 51 is a cross-section view of the barrel member of FIG. 49 along the line D-D.

FIG. 52 is an enlarged view of area "B" of the barrel member of FIG. 49.

FIG. 53 is an enlarged view of area "C" of the barrel member of FIG. 49.

DETAILED DESCRIPTION

Figure 1:
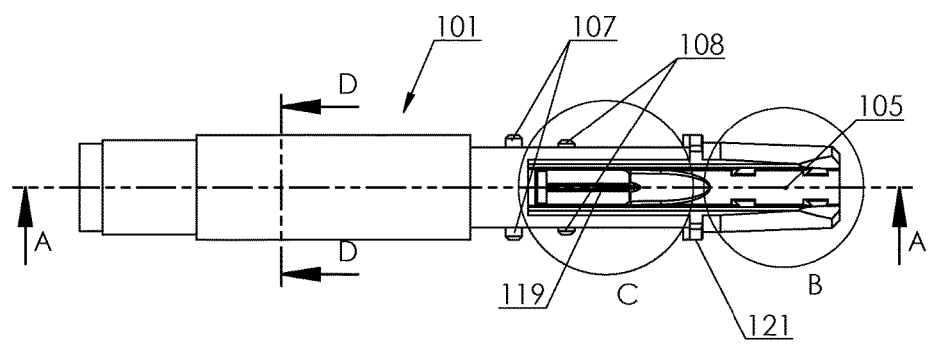
FIG. 1 is a top view of an embodiment of a barrel member.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventor has developed optical fiber connectors that facilitate splicing of first and second optical fibers, which require no special installation tool and provide a short termination time. The optical fiber connectors (e.g., field installable optical fiber connectors) typically comprise an assembly having a barrel member that receives a splicing member that aligns ends of the first and second optical fibers. The assembly can comprise a fiber stub/stub holder that is fixed on one end of barrel by pressed fit or bonding to hold first optical fiber in place. The assembly can further comprise a clamp disposed directly about the second optical fiber (e.g., field optical fiber from a field optical fiber cable) to lock the second optical fiber in place. For example, the assembly can comprise a cap that biases a surface of a clamping member and a surface of the barrel member toward one another to clamp the second optical fiber.

The barrel member can further receive a guiding member to guide the second optical fiber to the splicing member prior to clamping the second optical fiber in place. It should be noted that the guiding feature provided by the guiding member provides successful insertion of the second optical fiber (e.g., field optical fiber) to abut another optical fiber (e.g., a first optical fiber) inside splicing element. Without the guiding feature, the cleaved surface of the second optical fiber might be damaged by unnecessary impact with a surface of the barrel member or the splicing member. Furthermore, the guiding member and the splicing member can define apertures that are concentric easily based on current state of fabrication arts to minimize the micro bending that causes unpredictable losses. The barrel member can comprise a recess that is dimensioned to hold at least a portion of an optical fiber jacket, or an optical fiber coating. Preferably, the recess is dimensioned to hold at least a portion of the jacket of the second optical fiber cable to maintain the abutment after the second optical fiber is spliced with a first optical fiber before the second optical fiber is clamped in place by a cap.

Figure 2:
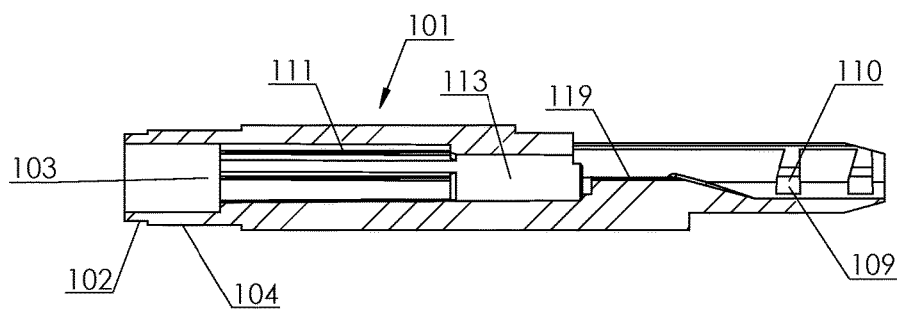
FIG. 2 is a cross-sectional view of the barrel member of FIG. 1 along the line A-A.

FIGS. 1 and 2 show an embodiment of a barrel member 101 having a first end and a second end. The first end of barrel member 101 comprises an internal cavity 103, a first reduced-diameter portion 102, and a second reduced-diameter portion 104. It is contemplated that internal cavity 103 is sized and dimensioned to receive at least one of a guiding member and a splicing member. Additionally, or alternatively, first reduced-diameter portion 102 and second reduced-diameter portion 104 are sized and dimensioned to provide an interference fit or press fit with another member (e.g., an optical fiber stub holder of a first optical fiber). Although barrel member 101 comprises first-reduced diameter portion 102 and second reduced-diameter portion 104, it is contemplated that barrel member 101 can have a single reduced-diameter sized and dimensioned to provide an interference fit or press fit with another member (e.g., an optical fiber stub holder of a first optical fiber). Barrel member 101 further comprises a projection 121 that extends from an exterior surface of barrel member 101. It is contemplated projection 121 can be used to couple barrel member 101 to another member (e.g., a cap having slots that receive projection 121).

Barrel member 101 further comprises projections 107 and 108 that extend from an exterior surface of barrel member 101. It is contemplated projection 107 can be used as the pivot to another member. For example, projections 107 can be configured to allow a clamp (e.g., clamping member 127 discussed below) to open and close to thereby receive and clamp an optical fiber, and projections 108 can be used as a stop or brake to limit rotation of the clamp.

The second end of barrel member 101 comprises a tapered recess 105 that is defined by a tapering surface 110 and locking surface 109. It is contemplated that tapered recess 105 is configured and dimensioned to receive at least a portion of an optical fiber jacket (e.g., a field optical fiber jacket). This portion of cable jacket can be push down from tapering surface 110 to locking surface 109. The gap provided by locking surface 109 is about 70% or less than the diameter of the optical fiber cable to thereby hold the optical fiber cable and maintain positive splicing contact before a clamp (e.g., clamping member 127 discussed below) locks an optical fiber in place. In other words, the optical fiber cable is preferably locked in position after the optical fiber of the optical fiber cable abuts with another optical fiber in a splicing member. Depending on the particular application, tapered recess 105 can be sized and dimensioned to receive and hold a 0.25 mm optical fiber cable, a 0.9 mm optical fiber cable, or a 1.2 mm optical fiber cable.

Figure 3:
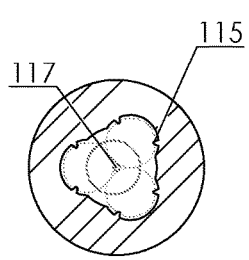
FIG. 3 is a cross-sectional view of the barrel member of FIG. 1 along the line D-D.

Between the first and second ends of barrel member 101 are a splicing section 111 that receives a splicing member, and a guiding section 113 that receives a guiding member. Splicing section 111 of barrel member 101 comprises projections 115 that extend toward a center of barrel member 101 as shown in FIG. 3. It is contemplated that small projections 115 can be deformed and support a splicing member that is disposed within barrel member 101. For example, projections 115 can support and push a 3-rod bundle toward the center line of barrel member 101 to thereby form an aperture 117 for optical fiber splicing. In such embodiment, it is contemplated that a member (e.g., optical fiber stub holder) is pressed fit on second reduced-diameter portion 104 to thereby push projections 115 inward to the center and press the 3-rod bundle to abut one another and form a precise aperture for splicing.

Figure 4:
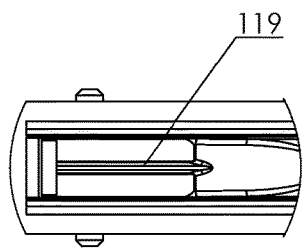
FIG. 4 is an enlarged view of area "C" of the barrel member of FIG. 1.

Additionally, barrel member 101 can comprise a U or V grooved surface 119 disposed on an interior surface as shown in FIG. 4. Preferably, U or V grooved surface 119 is disposed adjacent to a guiding member in guiding section 113. It is contemplated that U or V grooved surface 119 will help an optical fiber glide toward a guiding member in guiding section 113. The optical fiber jacket can be held in tapered recess 105 as described above and shown in FIG. 5.

FIG. 6 shows an embodiment of an assembly 100 having barrel member 101, a fiber stub 123, an optical fiber stub holder 122, a clamping member 127, a second optical fiber cable 129, and a cap 125. Optical fiber stub holder 122 is coupled to a first end of barrel member 101, clamping member 127 pivots on projections 107, and cap 125 is coupled to a second end of barrel member 101. As shown, a portion of cap 125 is disposed over clamping member 127. It is contemplated that cap 125 pushes down on clamping member 127 to thereby clamp an optical fiber of second optical fiber cable 129. Typically, assembly 100 can be used to terminate a second optical fiber cable 129 with a first optical fiber 133 that extends from an optical fiber stub 123. Optical fiber stub can be a ceramic (e.g., zirconia) capillary assembled with first optical fiber 133. It is contemplated that the optical fiber stub 123 can be held by optical fiber stub holder 122. Typically, second optical fiber cable 129 is a field optical fiber cable. Second optical fiber cable 129 can be a 0.9 mm optical fiber cable. However, other optical fiber cables are contemplated (e.g., a 0.25 mm optical fiber cable with 0.9 buffer tubing, a 1.2 mm optical fiber cable, etc.).

Assembly 100 comprises a splicing member 131 disposed within barrel member 101 as shown in FIG. 7. Splicing member 131 defines an aperture (e.g., aperture 117) having dimensions that align ends of a first optical fiber 133 and a second optical fiber 135 at a junction 137. In some embodiments, the ends of first optical fiber 133 and second optical fiber 135 are aligned within a radial tolerance of no more than 0.001 mm. In other words, the centers of the ends of first optical fiber 133 and second optical fiber 135 are aligned within 0.001 mm of each other when ends of first optical fiber 133 and second optical fiber 135 abut at junction 137. Preferably, the ends of first optical fiber 133 and second optical fiber 135 are aligned within a radial tolerance of no more than +0.001 mm for a single mode fiber, and no more than +0.002 mm for a multimode fiber to minimize losses.

Splicing member 131 comprises a first rod, a second rod, and a third rod that abut one another to define aperture 117 as shown in FIG. 8 (see also FIG. 3). It is contemplated that the first, second, and third rods can be identical size and shape. However, in other embodiments, at least one of the first, second, and third rods can have a different size and shape. For example, the first, second, and third rods can be assembled in accordance with Soddy circle geometry as described in U.S. Pat. No. 7,883,275, which is hereby incorporated by reference. As described above, barrel member 101 can comprise projections 115 that support and push the 3-rod bundle toward a center line for splicing of first optical fiber 133 and second optical fiber 135. It should be appreciated that there is no need for external clamping at junction 137 as used in conventional mechanical splicing.

Optical fiber stub holder 122 can be disposed on one end of barrel member 101. It is contemplated that optical fiber stub holder 122 comprises an aperture that is sized and dimensioned to receive at least one of optical fiber stub 123 and a first end of barrel member 101 (e.g., first reduced-diameter portion 102 for guiding and second reduced-diameter portion 104 for interference fit). Preferably, optical fiber stub holder 122 couples to at least one of optical fiber stub 123 and a first end of barrel member 101 (e.g., second reduced-diameter portion 104) in a press fit or interference fit. It is contemplated that optical fiber stub holder 122 can compress a first end of barrel member 101. For example, optical fiber stub holder 122 can compress an end of barrel member 101 to thereby push first, second, and third rods against each other to form splicing member 131, which forms an aperture 117. As shown in FIG. 7, first optical fiber 133 can extend from optical fiber stub 123 into splicing member 131. It should be appreciated that optical fiber stub holder 122 can be bonded or otherwise fastened to at least one of optical fiber stub 123 and a first end of barrel member 101.

Once the ends of first optical fiber 133 and second optical fiber 135 are abutted in splicing member 131, first optical fiber 133 and second optical fiber 135 can be held in place within barrel member 101 to maintain their abutment by holding a portion of second optical fiber cable 129 (e.g., jacket of second optical fiber 129) in tapered recess 105 of barrel member 101.

Second optical fiber 135 can be clamped in place to maintain a positive splice between first optical fiber 133 and second optical fiber 135. The clamp can comprise a clamping surface 126 of barrel member 101 and a surface of clamping member 127 that each press against second optical fiber 135. As shown in FIG. 8, clamping member 127 can be rotated to an open position. It is contemplated that projections 108 can press against an inner wall 152 of clamping member 127 to create friction force and thereby hold clamping member 127 in a desired open position to receive second optical fiber 135 or closed position. In another embodiment, it is contemplated that a projection can extend from clamping member 127 that contacts barrel member 101 to create friction and thereby hold clamping member 127 in a desired position (e.g., closed position, opened position, a position between opened and closed, etc.). It should be recognized that the ability to hold clamping member 127 in an opened position prevents inadvertent closure of the clamping member 127 when second optical fiber 135 is being received by barrel member 101. Barrel member 101 can comprise an opening 145 disposed above clamping surface 126 of barrel member 101 as shown in FIG. 8. Opening 145 is typically dimensioned to receive clamping member 127.

As shown in FIG. 7, the clamp can be disposed at a position distal from junction 137. However, in other embodiments, the position of the clamp can be further or closer to junction 137. It is contemplated that clamping surface 126 of barrel member 101 is U or V grooved surface 119. Thus, U or V grooved surface 119 can be used to guide the end of second optical fiber 135 toward splicing member 131, and also as a clamping surface to thereby press against second optical fiber 135 and maintain its position as shown in FIG. 7. It should be noted that the portion of second optical fiber 135 clamped can be optical fiber glass and that will establish a more positive clamping without yielding when encounter pulling or handling forces from second optical fiber cable 129.

It is contemplated that cap 125 can have a cavity that provides an interference fit with the second end of barrel member 101. Additionally, or alternatively, cap 125 can comprise slots and/or projections that mate with corresponding slots and/or projections on barrel member 101 to couple cap 125 with barrel member 101. Preferably, cap 125 has a cavity with dimensions to receive each of (a) at least a portion of clamping member 127 and (b) at least a portion of barrel member 101, and thereby biases a surface of clamping member 127 toward clamping surface 126 of barrel member 101 to clamp second optical fiber between the two surfaces as shown in FIG. 7. Cap 125 can be removable such that second optical fiber 135 can be reworked or repositioned if necessary by pulling second optical fiber 135 from splicing member 131 and re-striping the outer jacket of second optical fiber cable 129, cleaving second optical fiber 135 and re-splicing second optical fiber 135 again.

Additionally, or alternatively, second optical fiber cable 129 can be held in place by tapered recess 105 of barrel member 101. It is contemplated that tapered recess 105 is dimensioned to provide an interference fit with second optical fiber cable 129 to thereby hold second optical fiber cable 129 in place. Thus, second optical fiber 135 and second optical fiber cable 129 can both be held in place on barrel member 101 along with splicing member 131 to maintain the end of second optical fiber 135 abutted with the end of first optical fiber 133 without help of an additional tool. The assembly 100 with second optical fiber cable 129 and second optical fiber 135 act as one structure, such that optical cable 129 is unaffected by mating and un-mating operations of the optical fiber connecter thus with minimum disturbance to the splicing junction 137.

Assembly 100 can further comprise a guiding member 139 disposed within barrel member 101. Typically, guiding member 139 is disposed adjacent to splicing member 131, and defines a lumen 141 having dimensions that guide second optical fiber 135 to splicing member 131. It is contemplated that lumen 141 is coaxial with aperture 117 of splicing member 131 to guide second optical fiber 135 to junction 137. As shown in FIG. 7, at least a portion of lumen 141 has a tapered surface 143 to simplify the process of inserting the end of second optical fiber 135 into lumen 141 and eventually into aperture 117 of splicing member 131. Lumen 141 comprises a largest diameter that is within 20% larger than the diameter of second optical fiber 135. For example, lumen 141 can have a largest diameter of 0.150 mm when second optical fiber is a 0.125 mm optical fiber.

Enlarged views of clamping member 127 are shown in FIGS. 9A-9B. Clamping member 127 comprises a slot hole 151 that is sized and dimensioned to receive projections 107, which allows clamping member 127 to rotate between an open and closed position and thereby receive at least one of second optical fiber cable 129 and second optical fiber 135. Once first optical fiber 133 and second optical fiber 135 abut each other, and second optical fiber cable 129 is held by tapered recess 105, then clamping member 127 can be closed. It should be appreciated that cap 125 can be slid over clamping member 127 to prevent rotation of clamping member 127 to the open position.

Clamping member 127 comprises a tapered top surface 147 and rib 148 to facilitate cap 125 to slide over clamping member 127 and push a clamping member surface 149 toward clamping surface 126 of barrel member 101 to clamp second optical fiber 135. Additionally, or alternatively, clamping member 127 comprises a projection 150 that helps clamping member 127 grip a portion of second optical fiber cable 129 inside tapered recess 105.

An enlarged view of cap 125 is shown in FIGS. 10A-10B. Cap 125 comprises a slot 153 that extend along a sidewall of cap 125. It is contemplated that slot 153 is configured to receive projection 121 of barrel member 101 to couple barrel member 101 and cap 125. Cap 125 can further comprise slots 155 to provide adequate force and mechanical compliance to lock clamping member 127.

As described above, cap 125 has a cavity 157 that is sized and dimensioned to receive each of (a) at least a portion of clamping member 127 and (b) at least a portion of barrel member 101 to push clamping member 127 toward barrel member 101. Cap 125 comprises a first interior wall 161 that presses onto clamping member 127 and barrel member 101 to clamp second optical fiber 135. Furthermore, cap 125 comprises a second interior wall 159 that is tapered. It is contemplated that second interior wall 159 of cap 125 compresses the second end of barrel member 101 to reduce the size of tapered recess 105 and further lock second optical fiber cable 129 within tapered recess 105.

It should be appreciated that barrel member 101 can be molded or machined as a single piece, such that first optical fiber 133 and second optical fiber 135 maintain a concentric relationship to within 5 to 10 microns across the length of barrel assembly 101 (i.e., from first end through second end of barrel assembly 101). Furthermore, barrel member 101 can be designed to provide a distance between at least one of splicing member 131, guiding member 139, clamping member 127, and tapered recess 105 that is sufficient to prevent a sharp kink from forming due to a minor deviation in concentricity in barrel member 101.

Figure 11:
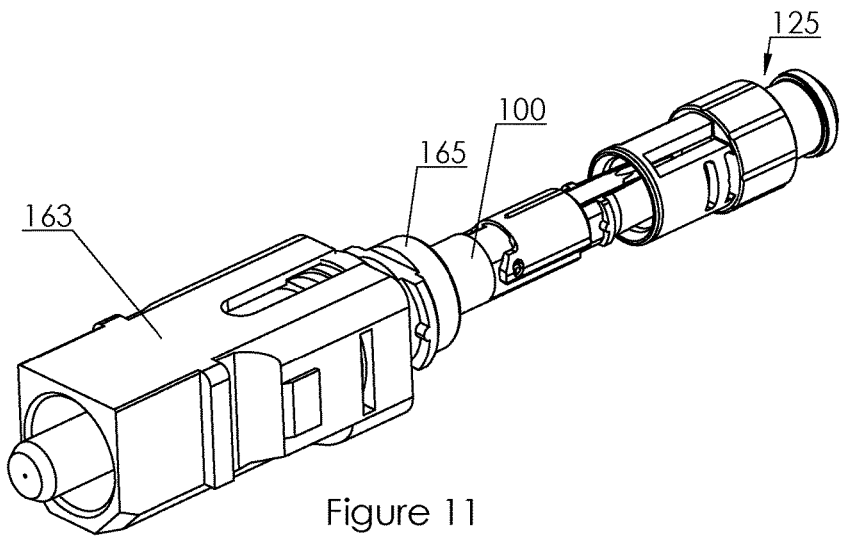
FIG. 11 is a perspective view of an embodiment of an SC inner shell, an SC backbone, and the assembly of FIG. 6.
Figure 12:
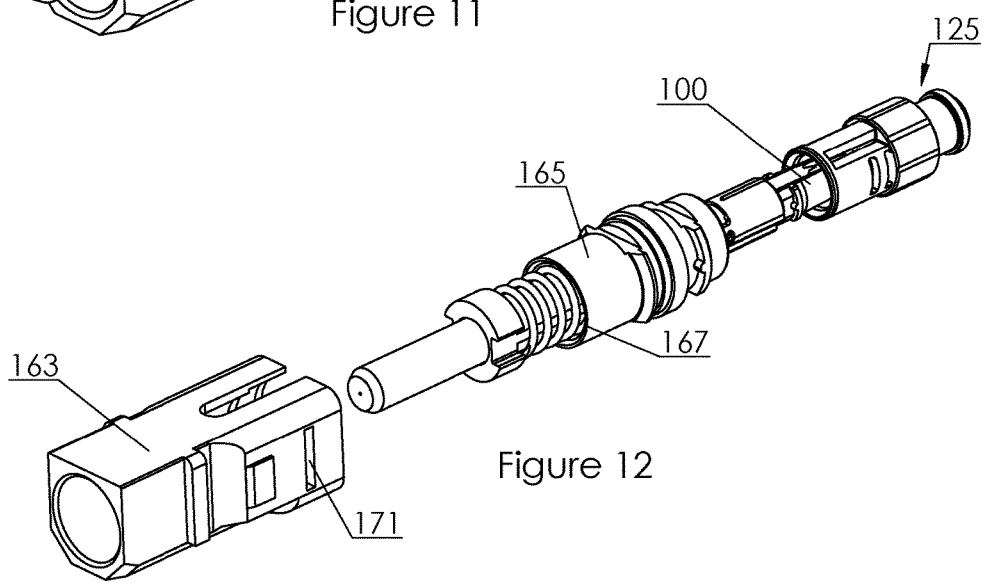
FIG. 12 is an exploded view of the SC inner shell, the SC backbone and the assembly of FIG. 11.
Figure 13:
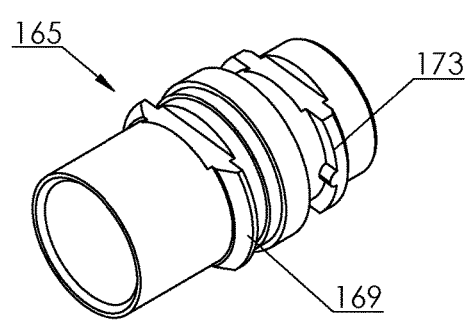
FIG. 13 is a perspective view of the SC connector backbone of FIG. 12.

Assembly 100 can be used in an SC connector kit as shown in FIG. 11. Assembly 100 is partially disposed within an SC inner shell 163 and an SC connector backbone 165. A compression spring 167 can be placed onto barrel member 101 of assembly 100 as shown in FIG. 12. It is contemplated that SC connector backbone 165 is snap-fitted with SC inner shell 163. For example, SC connector backbone 165 can comprise a projection 169 (see FIG. 13) that is received by a slot 171 of SC inner shell 163. SC connector backbone 165 can further comprise a second projection 173 that can receive a crimp sleeve (see, e.g., crimp sleeve 181 on FIG. 18) to support medium/heavy duty optical fiber cables (e.g., a 2 or 3 mm optical fiber cable).

Figure 14:
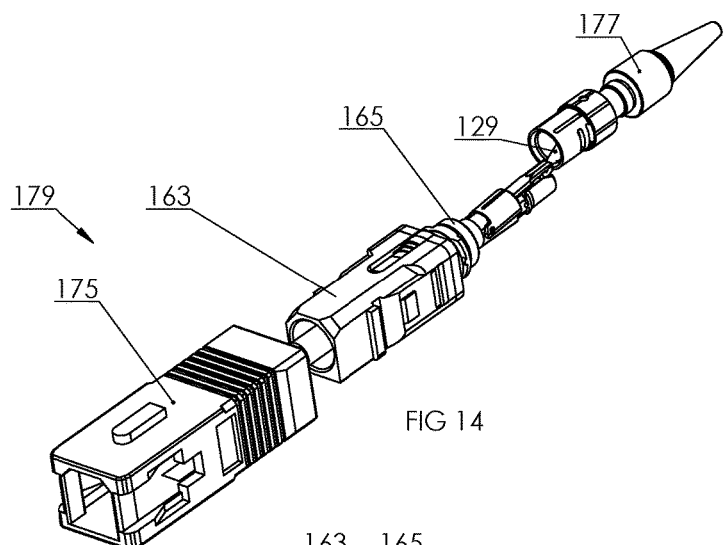
FIG. 14 is an exploded view of the SC inner shell, the SC backbone and the assembly of FIG. 11 and an embodiment of an SC outer shell (collectively referred to as an "SC connector"), and an embodiment of a boot with a second optical fiber (e.g., a field optical fiber) to be spliced.
Figure 15A:
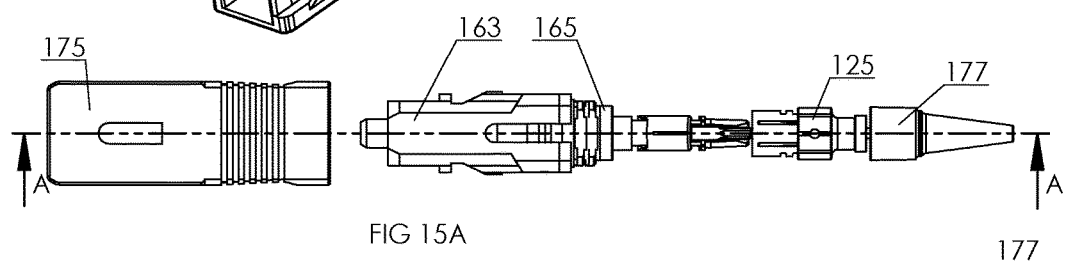
FIG. 15A-15B is a top view and a cross-sectional view along line A-A of the SC connector and the boot of FIG. 14.
Figure 15B:
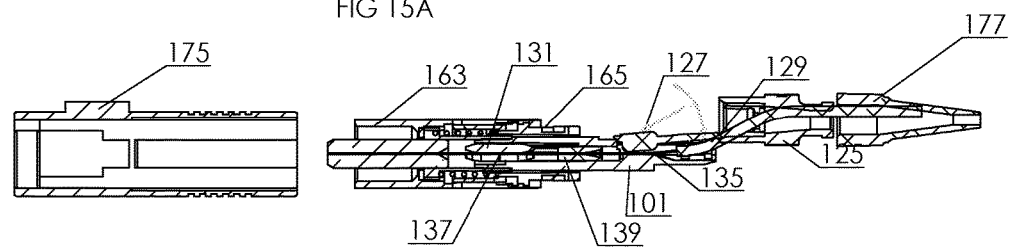
Figure 16:
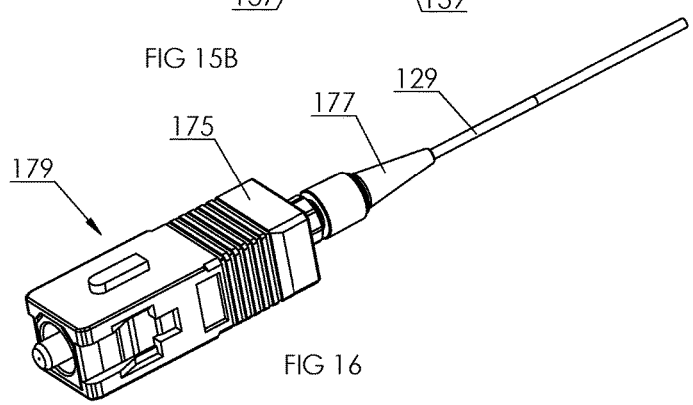
FIG. 16 is a perspective view of the SC connector and the boot of FIG. 14.

Inner shell 163 can be slid into an SC outer shell 175 to thereby form an SC connector 179 as shown in FIGS. 14-16. It is contemplated that an SC termination kit can be provided that includes assembly 100, SC inner shell 163, SC connector backbone 165, SC outer shell 175, spring 167, cap 125, and a boot 177. It is contemplated that at least two of 100, SC inner shell 163, SC connector backbone 165, and SC outer shell 175 can be pre-assembled. Typically, a field technician inserts second optical fiber cable 129 through boot 177 and cap 125. The technician then strips second optical fiber cable 129 to remove the buffer coating and expose second optical fiber 135. Second optical fiber 135 is cleaved to a proper length and is wiped clean. Second optical fiber 135 is inserted through the second end opening 145 of barrel member 101 and is guided by U or V grooved surface 119 while clamping member 127 is lifted open to allow second optical fiber 135 to pass through to guiding member 139.

Second optical fiber 135 is inserted through guiding member 139 until it second optical fiber 135 is spliced (i.e., abuts) with first optical fiber 133 in splicing member 131. Once splicing, the technician can applying forwarding pressure and push second optical fiber cable 129 into tapered recess 105 of barrel member 101 which applying and maintaining positive pressure to maintain the abutment of the ends of second optical fiber 135 and first optical fiber 133. Clamp 127 can then be closed and projection 150 of clamp 127 will further grip and flatten second optical fiber cable 129 in tapered recess 105. It is contemplated that second optical fiber cable 129 can be inserted at a 15 degree angle to push the end of second optical fiber 135 against the end of first optical fiber 133 as shown in FIG. 15B. Cap 125 can then engage barrel member 101 and clamping member 127 is rotated to a closed position to clamp second optical fiber 135 and tighten the hold on second optical fiber cable 129 within tapered recess 105 of barrel member 101. SC outer shell 175 is slid onto SC inner shell 163 to thereby form SC connector 179 as shown in FIG. 16. It is contemplated that second optical fiber cable 129 is a 0.9 mm optical fiber cable. However, it is contemplated that second optical fiber cable 129 can be other sizes, such as a 0.25 mm optical fiber cable with 0.9 mm loose buffer tube, or a 1.2 mm optical fiber cable.

Figure 17:
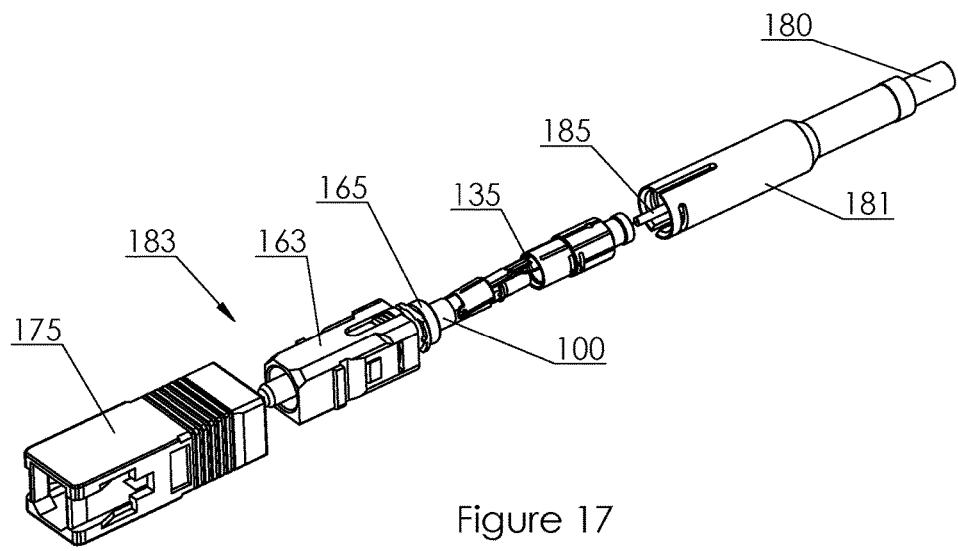
FIG. 17 is an exploded view of the SC connector of FIG. 16 without the boot and an embodiment of a crimp sleeve with a medium or heavy duty field fiber optical cable such as 2 mm/3 mm jacket cables or 3 mm reinforced or armored cables.
Figure 18:
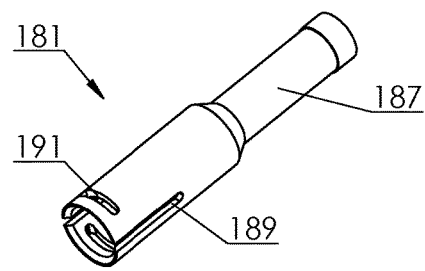
FIG. 18 is a perspective of the crimp sleeve of FIG. 17.
Figure 19:
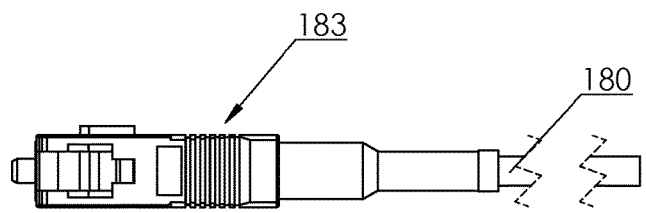
FIG. 19 is a side view of the SC connector and crimp sleeve of FIG. 17.

For a medium/heavy duty optical fiber cable 180 (e.g., 2 mm/3 mm optical fiber cable), it is contemplated that a crimp sleeve 181 can be used to form an SC connector 183 as shown in FIGS. 17-19. With the exception of boot 177, SC connector 183 is formed using the same components as SC connector 179 shown in FIGS. 14-16. SC connector 183 comprises SC outer shell 175, SC inner shell 163, SC connector backbone 165, barrel member 101, cap 125, and the other components of assembly 100. Heavy duty optical fiber cable 180 is stripped to expose an optical fiber 185 (e.g., a fixed length of 900 um) and a fix length of bare fiber 135 for splicing, which is spliced with first optical fiber 133 (e.g., a bare fiber) using the technique described with respect to second optical fiber 135.

Crimp sleeve 181 comprises a sleeve 187, a first slot 189, and a second slot 191 as shown in FIG. 18. It is contemplated that second projection 173 of SC connector backbone 165 is received by second slot 191 to thereby couple crimp sleeve 181 with SC connector backbone 165. Once SC connector backbone 165 and crimp sleeve 181 are coupled, a technician can use a crimp tool to compress sleeve 187 and locks with heavy duty optical fiber cable 180. It is contemplated that sleeve 187 is sized and dimensioned to receive a 2 mm/3 mm or 2×3 mm optical fiber cables. SC connector 183 has greater pull resistance due to the fact that a pulling force on heavy duty optical fiber cable 180 will transmit the force through crimp sleeve 181, SC connector backbone 165, SC inner shell 163, SC outer shell 175, and finally an SC connector adapter. Thus, there is minimal disturbance to the splicing section because the exterior components (shells, backbone) of SC connector 183 transmit the force elsewhere (e.g., to the SC connector adapter). Although a boot is not shown, it is contemplated that SC connector 183 can further comprise a boot to prevent a sharp bend on heavy duty optical fiber cable 180 or heavy duty optical fiber 185 during handling or installation.

Figure 20:
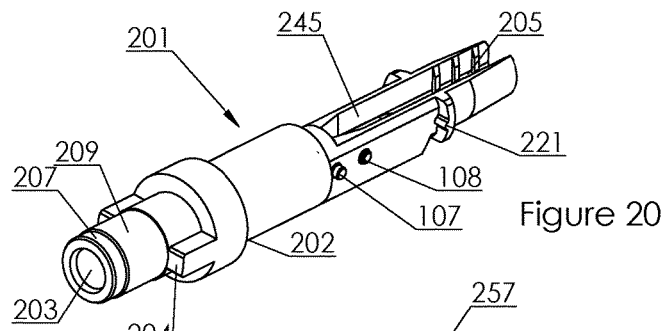
FIG. 20 is a perspective view of an embodiment of an LC barrel member having an aperture that accommodates an optical fiber stub assembly for an LC connector that includes a splicing member.

Although assembly 100 for use in SC style field terminable connectors with 3 rods bundle as splicing member is discussed above, it is contemplated that an assembly can be used in an LC style field terminable connector with a ferrule as splicing member. For example, FIGS. 20-22 show an assembly 200 comprises a barrel member 201 having a cavity 203 at a first end that is sized and dimensioned to receive a splicing ferrule 231. Barrel member 201 further comprises a first reduced diameter portion 207 and a second diameter portion 209. It is contemplated that an optical fiber stub holder 223 comprises an inner diameter 219 sized and dimensioned to receive at least one of first reduced diameter portion 207 and second diameter portion 209 by press fit or an interference fit. Optical fiber stub holder 223 can comprise a hex component to conform with LC connector standards and a concentric hole that receives a splicing ferrule 231 by press fit or interference fit. Barrel member 201 comprises a tapered recess 205 at a second end that is configured to receive an optical fiber cable (e.g., second optical fiber cable 229). A ridge 202 extends about an exterior surface of barrel member 201 and comprises a projection 204. Ridge 202 is configured to abut against a spring when assembly 200 is installed with LC connector outer shell which provide connector spring load per connector specification (e.g., similar to spring 167 in FIG. 12), and projection 204 fitted slots inside LC front housing that prevents rotation of barrel member 201 when installed in an LC connector. Similar to barrel member 101, barrel member 201 comprises (i) projections 107 that can be used to rotatably couple another member (e.g., clamp 227), (ii) projections 108 to limit rotation of the other member rotatably coupled, and (iii) projection 221 that can be used to couple barrel member to a second member (e.g., a cap).

Figure 21A:
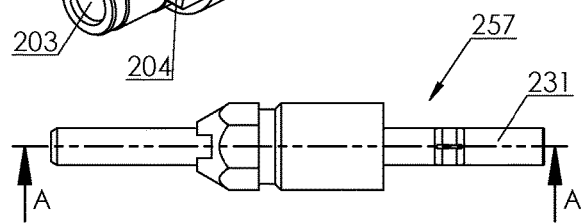
FIGS. 21A-21B are a side view and a sectional view of an optical fiber stub assembly for an LC connector that includes a splicing member, an optical fiber, an optical fiber stub, and an optical fiber stub holder suitable for LC connector.
Figure 21B:
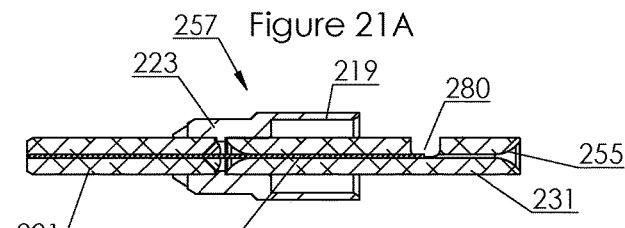
Figure 22A:
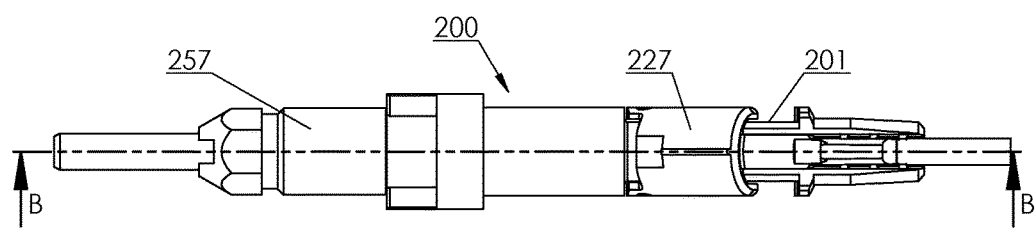
FIG. 22A-22B are a side view and a sectional view of an assembly having the barrel member of FIG. 20, the optical fiber stub assembly for an LC connector of FIG. 21, and a fiber clamping member.
Figure 22B:
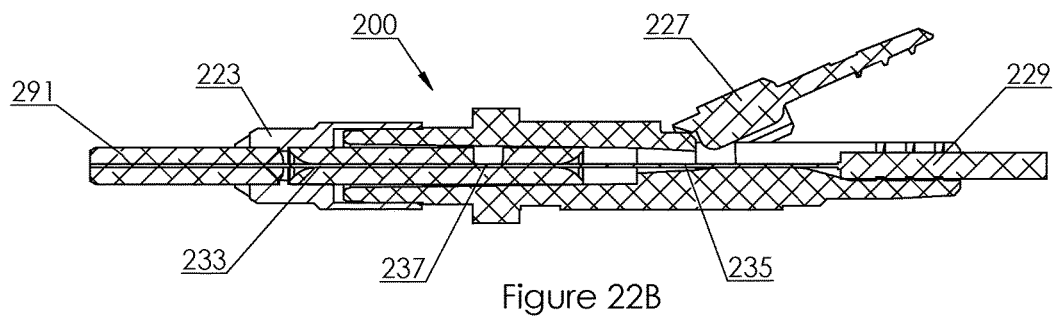

FIGS. 21A-21B are a top view and sectional view of a fiber stub ferrule/splicing ferrule holder assembly 257 that includes splicing ferrule 231 typically held by optical fiber stub holder 223 by press fit or bonding. Additionally, or alternatively, optical fiber stub holder 223 can hold by press fit or bonding an optical fiber stub 291 having a first optical fiber 233 that extends from an end of optical fiber stub 291. It should be appreciated that an advantage of fiber stub ferrule flange assembly 257 is providing a concentric relationship between optical fiber stub 291 and splicing ferrule 231, which can be easily controlled by the machining tolerance of optical fiber stub holder 223. It is contemplated that the optical fiber splicing location 280 can be predetermined easily after splicing ferrule 231 and optical fiber stub 291 are fixed in optical fiber stub holder 223 with better mechanical integrity if optical fiber stub holder 223 is made of metal. It should be appreciated that a U-shaped slot can be disposed at the optical fiber splicing location 280 to allow entrapped air between the optical fibers to escape during splicing. Additionally, the U-shaped slot also allows a user to visually inspect the ends of the optical fibers to ensure they are in the correct location for splicing.

Splicing ferrule 231 can comprise a funnel 255 to allow a second optical fiber to be inserted into the splicing ferrule 231 with greater ease. It should be appreciated that the function of funnel 255 is similar to guide member 139 of assembly 100 in guiding a second optical fiber to abut a first optical fiber. Some other components of assembly 200 are similar to those of assembly 100. For example, assembly 200 comprises a clamping member 227, a projection 221 and an opening 245, which are components of assembly 100. It is contemplated that the features of each of these components as discussed in assembly 100 are applicable in assembly 200. Additionally, other features of assembly 100 that are not shown in assembly 200 are also applicable (e.g., U or V grooved surface 119, etc.). It is contemplated that fiber stub ferrule flange assembly 257 can be used on an SC style connector with minor changes on optical fiber stub holder 223 to conform to the SC style connector flange industrial standard.

It should be appreciated that a second optical fiber 235 (e.g., a field optical fiber) can be spliced with a first optical fiber 233 in assembly 200 using a similar technique described with respect to assembly 100. For example, it is contemplated that barrel member 201 can receive second optical fiber 235 to splice with first optical fiber 233 in splicing ferrule 231 at a junction 237, such that (i) the field optical fiber cable is held in place by tapered recess 205 and (ii) the second optical fiber is clamped between a clamping surface of barrel member and a surface of clamping member 227. Funnel 255 on splicing ferrule 231 can be used to guide the second optical fiber to abut first optical fiber 233. It should be appreciated that clamping member 227 is rotatably coupled with barrel member 201 to thereby transition between an open and closed configuration as discussed above. The second optical fiber cable can be a 0.9 mm optical fiber cable. However, other optical fiber cables are contemplated (e.g., a 0.25 mm optical fiber cable with 0.9 mm buffer tube, a 1.2 mm optical fiber cable, etc.).

FIGS. 23A-23B show an embodiment of an LC connector front shell 206, and FIGS. 24A-24B show an embodiment of an LC connector back shell 208. LC connector front shell 206 comprises a hook 210 that is received by a slot 212 of LC connector back shell 208. Furthermore, LC connector front shell 206 comprises a projection 214 that abuts projection 204 of barrel member 201 to prevent rotation of barrel member 201. LC connector back shell 208 comprises a second slot 216 that can be used to couple with other housing if needed. LC connector backbone 208 comprises a cavity that is sized to receive a portion of LC connector front shell 206. An interior wall 218 of LC connector back shell 208 provides support for spring 226 and a projection 266 on LC connector front shell 206, and prevents over-insertion into LC connector back shell 208. LC connector back shell 208 comprises an arm 220 and LC connector front shell 206 comprises an arm 222 that engage one another for un-mating from an LC adaptor. It is contemplated that LC connector front shell 206 and arm 222 follow the industrial standard design to insure connector mating with industrial standard connector and adaptor.

An LC connector 224 with a second optical fiber cable 229 (e.g., 0.9 mm optical fiber cable) is shown in FIGS. 25-26. It is contemplated that LC connector front shell 206 and LC connector back shell 208 couple one another to house a compression spring 226 and a portion of assembly 200. Similar to the technician preparation process described in FIGS. 14-16, a technician inserts a boot (not shown) and cap 225 through second optical fiber cable 229. After stripping the buffer coating from second optical fiber cable 229, the second optical fiber is cleaned and cleaved to a specific length. The second optical fiber is inserted through a second end of barrel member 245 to abut a first optical fiber 233. Second optical fiber cable 229 is held in tapered recess 205, clamping member 227 is closed, and cap 225 is slid onto a clamping member 227 and barrel member 201 to clamp the second optical fiber and further tightening second optical fiber cable 229 by tapered recess 205 and clamping member 227.

FIGS. 27A-28B show different views of a bottom clam shell 228 and a top clam shell 230, which can collectively be used to house one or multiple LC connectors. Bottom clam shell 228 and top clam shell 230 comprise first projections 232 and second projections 234 that are received by slots of an LC connector back shell (e.g., second slot 216 of LC connector back shell 208). A threaded hole or insert 236 is disposed on bottom clam shell 228 and a clearance hole on top clam shell 230 that can receive a fastener. However, in other embodiments, it is contemplated that bottom clam shell 228 and top clam shell 230 can be coupled through a snap-fit connection (e.g., a male-female connector).

FIGS. 29A-29B show a crimp sleeve 281 that can be at least partially disposed between bottom clam shell 228 and top clam shell 230. Crimp sleeve 281 comprises a sleeve 242, and a groove 238 near a flat portion 240. Typically, flat portion 240 is disposed between clam shell 228 and top clam shell 230 and groove 238 is locked by an edge 241 when assembled to integrate crimp sleeve 281 with the clam shell assembly to prevent rotation of sleeve 281.

FIGS. 30-31 show an LC duplex connector 244 having top clam shell 228 and bottom clam shell that collectively house at least portions of a first LC connector 246 and a second LC connector 248, and at least a portion of crimp sleeve 281. A heavy duty dual optical fiber cable 252 having optical fibers 254 can be inserted into first LC connector 246 and second LC connector 248. It is contemplated that optical fibers 254 are 0.125 mm optical fibers with 0.25 mm buffer coating. It is contemplated that a 0.9 mm buffer tube can be applied to 0.25 mm optical fibers 254 before splicing to allow barrel 201 with tapered recess 205 designed for 0.9 mm to receive a bare fiber such as 0.25 mm cable via use of the buffer tube.

Top clam shell 228 and bottom clam shell 230 can be coupled using a fastener 250. It should be appreciated that flat portion 240 and groove 238 of crimp sleeve 281 are used to orient crimp sleeve 281 within top clam shell 228 and bottom clam shell 230. Once top clam shell 228 and bottom clam shell 230 are coupled, sleeve 242 of crimp sleeve 281 can be compressed using a crimp tool to lock with heavy duty dual optical fiber cable 252. Thus, any pulling or bending forces onto or from heavy duty dual optical fiber cable 252 will typically transmit through crimp sleeve 281 to top clamp shell 228 and bottom clam shell 230 through the housings of first LC connector 246 and second LC connector 248, and to the adapter for LC duplex connector 244 (if the force is strong enough) without disturbing the splicing sections in each of first LC connector 246 and second LC connector 248. It should be appreciated that each of first LC connector 246 and second LC connector 248 has the same components as LC connector 224. It should be appreciated that the top clam shell 228 and bottom clam shell 230 can be coupled by snap fit without using a fastener. It should be appreciated that the similar clamshell design disclosed can be of simplex (single) LC connector with heavy duty cable such as size 3 mm or 2×3 mm also.

Figure 32:
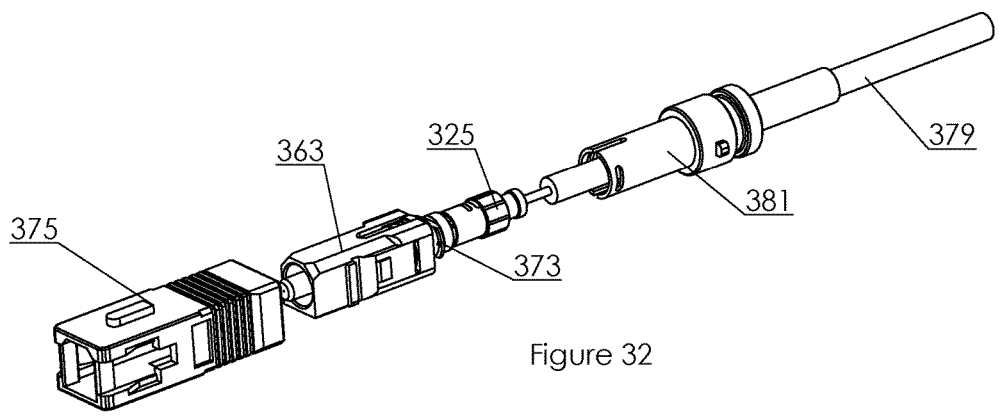
FIG. 32 is an exploded view of an embodiment of a field terminable SC connector with a hardened crimp sleeve.
Figure 33:
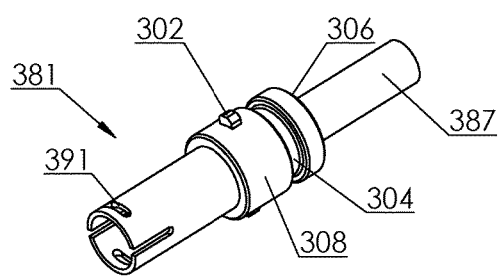
FIG. 33 is a perspective view of the hardened crimp sleeve of FIG. 32.
Figure 34:
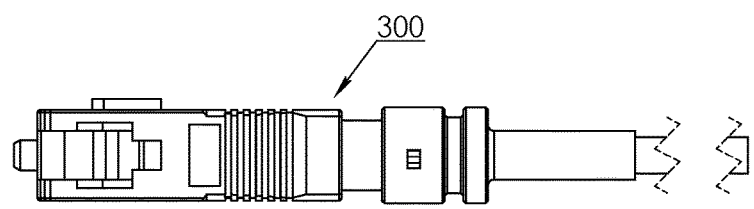
FIG. 34 is a side view of the SC connector and hardened crimp sleeve of FIG. 32.

FIGS. 32-34 show another embodiment of an SC connector 300 having a crimp sleeve 381. With the exception of crimp sleeve 181 of SC connector 183, it is contemplated that SC connector 300 has the same components as SC connector 183 (e.g., same assembly, barrel member, splicing member, guiding member, etc.). As shown in FIG. 32, SC connector 300 comprises an outer shell 375, an inner shell 363, and a cap 325. A heavy duty optical fiber cable 379 can be stripped and spliced with a second optical fiber as described above.

Crimp sleeve 381 can comprise a slot 391 that can receive a projection 373 of the SC connector backbone. Crimp sleeve 381 further comprises a projection 302 on an outer surface 308 that can be used to assist in maintaining correct orientation, an O-ring groove 304 is provided for sealing, and a shoulder 306 is provided for load bearing from cable pulling. Crimp sleeve 381 comprises sleeve 387 that can be compressed using a crimp tool to lock onto heavy duty optical fiber cable 379.

FIG. 35 shows an exploded view of a hardened SC connector jumper cable 310. Hardened SC connector jumper cable 310 comprises a hardened backbone 312, a hardened boot 314, a hardened seal cap 316, and an attachment string 318. Projection feature 302 on hardened crimp sleeve 381 is coupled slot feature 326 on hardened backbone 312 and locating pins 322 can be inserted into an aperture of hardened backbone 312 to thereby couple an aperture of an adapter to maintain the orientation of connector 300. Hardened SC connector jumper cable 310 can be used with SC connector 300 and crimp sleeve 381 along with an O-ring 326. It is contemplated that a hardened optical fiber cable 320 can be stripped and spliced with a second optical fiber in SC connector 300.

FIGS. 36A-38C show additional details of the components of hardened SC connector jumper cable 310. FIG. 36A-38B show hardened backbone 312 having an aperture 324 that can receive crimp sleeve 381 and O-ring 326 to seal the outside environment and reduce the risk of contamination. Hardened backbone 312 further comprises a slot 326 and a cavity 328 that mate with components of an adapter to maintain correct orientation. Within aperture 324 is a ridge 330 that abuts shoulder 306 of crimp sleeve 381. An outer ring 332 defines a cavity 334 that is sized and dimensioned to receive a portion of hardened boot 314. The outer ring 332 also bears the pulling load against interior surface of hardened seal cap 316.

Hardened seal cap 316 comprises an aperture 336 that is sized and dimensioned to receive a portion of hardened boot 314. Hardened seal cap 316 further comprises a groove 338 that can receive attachment string 318. A lip 340 extends on one end of hardened seal cap 316. Hardened boot 314 comprises a first lip seal 342, a second lip seal 344, and a flat surface 346 disposed on a lip 348. It is contemplated that first lip seal 342 can abut a surface within cavity 334 of hardened backbone, second lip seal 344 can abut an interior surface of hardened seal cap 316, and flat surface 346 can abut a second interior surface of hardened seal cap 316.

Figure 39:
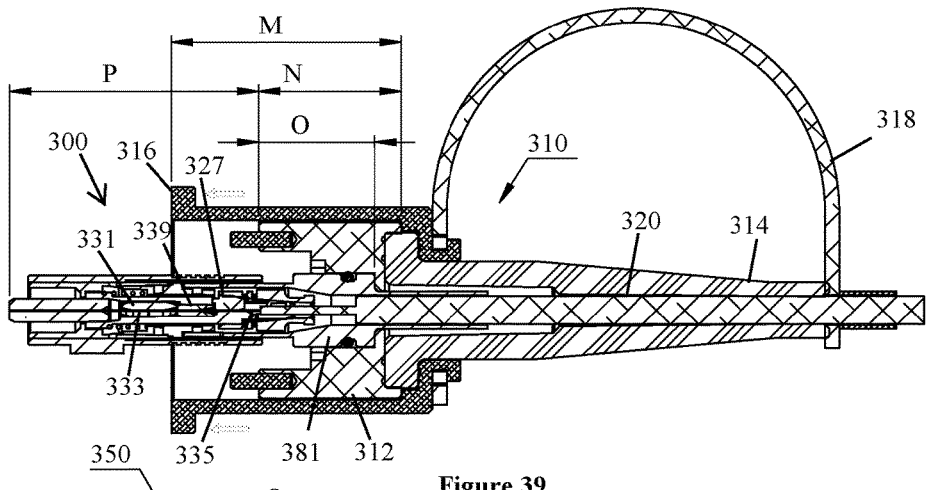
FIG. 39 is a cross-sectional view of the assembly of FIG. 35 in an assembled state.
Figure 40:
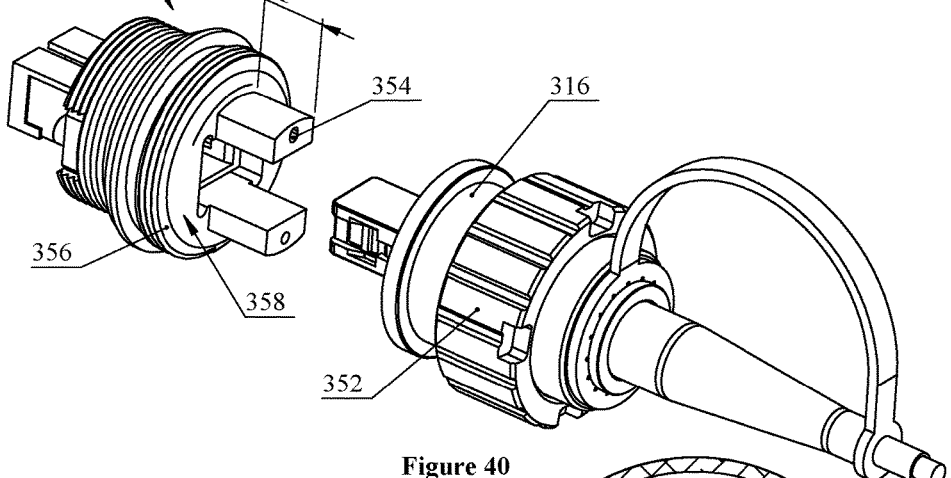
FIG. 40 is a perspective view of the assembly of FIG. 35 with an embodiment of a hardened SC connector adapter.

FIG. 39 shows a cross-sectional view of SC connector 300 and hardened SC connector jumper cable 310 in an assembled state. As discussed above, hardened SC connector jumper cable 310 comprises hardened backbone 312, hardened boot 314, hardened seal cap 316, and attachment string 318, and SC connector 300 comprises a splicing member 331, a guiding member 339, and a clamping member 327 that collectively splice a first optical fiber cable 333 with a second optical fiber cable 335. Crimp sleeve 381 can be compressed using a crimp tool to lock onto hardened optical fiber cable 320. It is contemplated that a width "P" can be controlled by modifying at least one widths "M", "N", "0", and a width "Q" as shown in FIG. 40. The width P is the mechanical reference for mating another connector.

Figure 41:
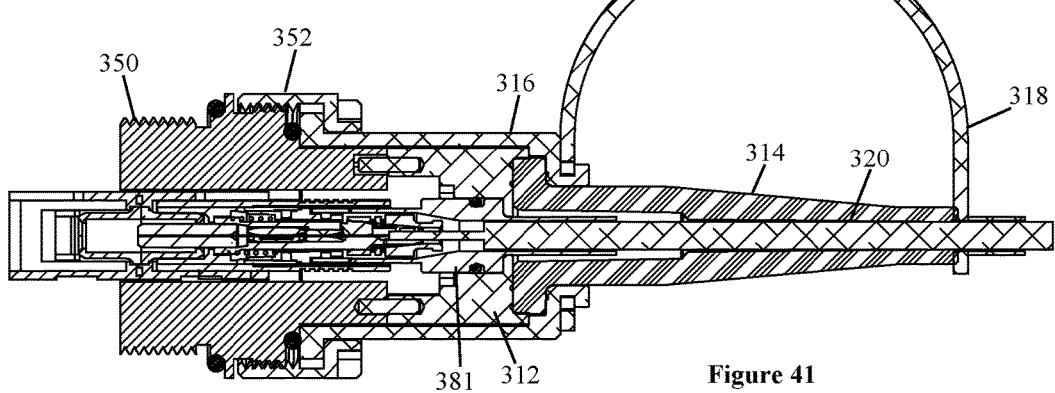
FIG. 41 is a cross-sectional view of the assembly of FIG. 40 in an assembled state.

It is contemplated that SC connector 300 and hardened SC connector jumper cable 310 can be coupled to an adapter 350 via a fastener 352. Adapter 350 comprises an aperture that is configured to receive a projection (e.g., alignment pins 322) to properly align adapter 350 when coupling with SC connector 300 and hardened SC connector jumper cable 310. Adapter 350 comprises threads and an O-ring 356 near a front surface 358. Fastener 352 is configured to engage threads of adapter 350, which thereby clamp a portion of hardened seal cap 316 against O-ring seal 356 as shown in FIG. 41 to be water and dust proof.

FIG. 42 shows an embodiment of a barrel member 400 of an optical fiber mechanical splicer. Unlike many of the embodiments above, barrel member 400 is configured to mate with another barrel member to splice first and second optical fibers. Barrel member 400 comprises a projection 402 and an aperture 404 proximal to a ridge 406. It is contemplated that projection 402 and aperture 404 are configured to mate with a corresponding aperture and projection to properly align barrel member 400 with a second barrel member. A backbone assembly 408 as shown in FIGS. 43A-43B can be used to couple barrel member 400 with a second barrel member. Backbone assembly 408 comprises a first backbone member 410 and a second backbone member 412 that can be fastened together. When fastened, a cavity 414 is formed that is sized and dimensioned to receive ridge 406 of barrel member 400 and a corresponding ridge of another barrel member.

FIGS. 44A-44B show barrel member 400 mated with a second barrel member 420 and a splicing member 437 encased by barrel member 400 and second barrel member 420. A first optical fiber 416 of a first optical fiber cable 422 is spliced with a second optical fiber 418 of a second optical fiber cable 424. It is contemplated that first optical fiber 416 is clamped and first optical fiber cable 422 is secured within barrel member 400. Barrel member 400 and barrel member 420 interact with similar components as other barrel members described above (e.g., guiding member, a clamping member, a cap, etc.), and it should be appreciated that the same features of those similar components described above are applicable in this embodiment.

First optical fiber 416 can be inserted through a guiding member 426 disposed in barrel member 400 to a splicing member 437. To secure first optical fiber 416, a clamping member 428 can press first optical fiber 416 against a clamping surface of barrel member 400. Additionally, or alternatively, first optical fiber cable 422 can be secured in a tapered recess of barrel member 400. As described in other embodiments, a cap 430 can couple barrel member 400 to thereby push clamping member 428 toward the clamping surface of barrel member 400. It is contemplated that a boot 432 can couple cap 430.

Similarly, second optical fiber cable 418 can be inserted through a guiding member 434 disposed in second barrel member 420 to a splicing member 437. To secure second optical fiber 418, a clamping member 436 can press second optical fiber 418 against a clamping surface of second barrel member 420. Additionally, or alternatively, second optical fiber cable 424 can be secured in a tapered recess of second barrel member 420. As described in other embodiments, a cap 438 can couple second barrel member 420 to thereby push clamping member 436 toward the clamping surface of second barrel member 420. It is contemplated that a boot 440 can couple cap 438.

Unlike other splicing members described above, splicing member 437 is at least partially disposed in both barrel member 400 and second barrel member 420. However, it is contemplated that splicing member 437 can be disposed in either barrel member 400 or second barrel member 420. Splicing member 437 comprises a first rod, a second rod, and a third rod that abut one another to define an aperture for splicing first optical fiber 416 and second optical fiber 418. However, other splicing members are contemplated such as splicing ferrule, V or U groove and press plate and so on. Barrel member 400 and second barrel member 420 can be coupled using backbone assembly 408.

First optical fiber cable 422 and second optical fiber cable 424 can each be a 0.9 mm optical fiber cable. However, other optical fiber cables are contemplated (e.g., a 0.25 mm optical fiber cable with 0.9 mm buffer tube, a 1.2 mm optical fiber cable, a 3 mm optical fiber cable, etc.). For example, first optical fiber cable 422 and second optical fiber cable 424 can each be a 3 mm optical fiber cable. In such embodiment, it is contemplated that a first crimp sleeve 442 and a second crimp sleeve 444 can be used as shown in FIG. 45.

Figure 46:
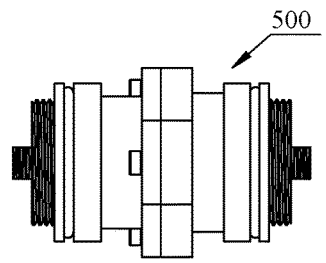
FIG. 46 is a top view of an embodiment of a hardened SC connector adapter.
Figure 47:
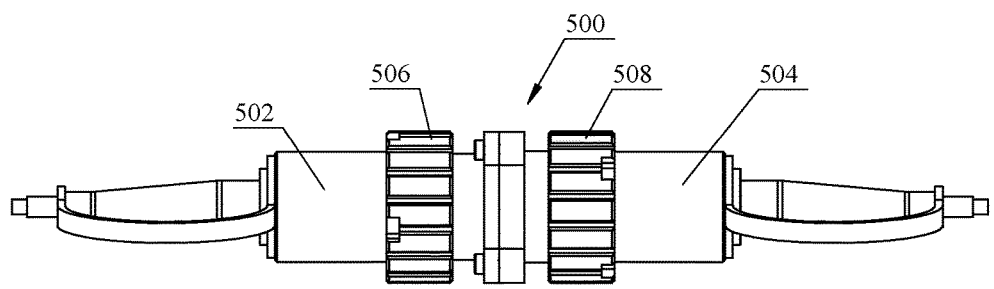
FIG. 47 is a top perspective view of two hardened SC connectors coupled with the hardened SC connector adaptor of FIG. 46.
Figure 48:
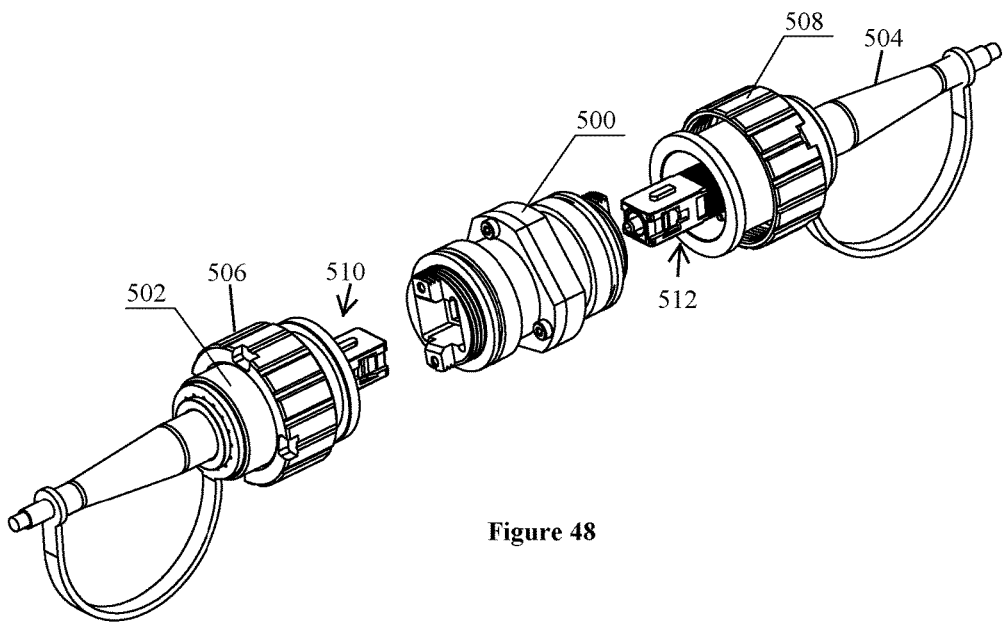
FIG. 48 is an exploded view of the two hardened SC connectors and the hardened SC connector adaptor of FIG. 47.

FIG. 46 shows a hardened SC adapter 500 having an industrial standard adapter installed inside. Hardened SC adapter 500 can be used to couple a first hardened SC connector jumper cable 502 and a second hardened SC connector jumper cable 504 as shown in FIG. 47. It is contemplated that each of first hardened SC connector jumper cable 502 and second hardened SC connector jumper cable 504 can be fastened to hardened SC adapter 500 using a first fastener 506 and a second fastener 508. First fastener 506 and second fastener 508 can comprise threads that mate with threads on hardened SC adapter 500. It should be appreciated that first hardened SC connector jumper cable 502 is coupled to a first SC connector 510 and second hardened SC connector jumper cable 504 is coupled to a second SC connector 512 as shown in FIG. 48. The internal structure of first SC connector 510 and second SC connector 512 can have the same internal structure as SC connectors described herein (e.g., SC connector 310 in FIG. 39).

FIGS. 49 and 50 show another embodiment of a barrel member 601 having a first end and a second end. The first end of barrel member 601 comprises an internal cavity 613 that is sized and dimensioned to receive at least one of a guiding member, a splicing member, and an optical fiber stub holder having a first optical fiber. Preferably, internal cavity 613 provides a press-fit or interference fit with a guiding member. Barrel member 601 further comprises a projection 621 that extends from an exterior surface of barrel member 601. It is contemplated that projection 621 can be used to couple barrel member 601 to another member (e.g., a cap having slots that receive projection 621).

The first end of barrel member 601 can further comprise a first reduced-diameter portion 602 and a second reduced-diameter portion 604. It is contemplated that first reduced-diameter portion 602 and second reduced-diameter portion 604 are sized and dimensioned to provide an interference fit or press-fit with another member. In other embodiments, barrel member 601 can comprise more or less than two reduced-diameter portions on the first end. The second end of barrel member 601 comprises a tapered recess 605 having a tapering surface 607 and a locking surface 109. Depending on the particular application, tapered recess 605 can be sized and dimensioned to receive a 0.25 mm optical fiber cable, a 0.5 mm optical fiber cable, a 0.75 mm optical fiber cable, a 0.9 mm optical fiber cable, a 1.5 mm optical fiber cable, or a 3 mm optical fiber cable.

It is contemplated that projections 615 as shown in FIG. 51 can support a splicing member 631 that is disposed within barrel member 601. For example, projections 615 can support and push a 3-rod bundle toward a center line of barrel member 601 to thereby form an aperture 617 for optical fiber splicing. It is contemplated that each set of projections 615 are disposed within a circular array at 120 degrees offset from each other set. Additionally, or alternatively, barrel member 601 can comprise a U or V grooved surface 619 disposed on an interior surface as shown in FIG. 52. It is contemplated that U or V grooved surface 619 will help guide an optical toward a guiding member. The optical fiber cable can be locked in tapered recess 605 as described above and shown in FIG. 53.

Figure 54A:
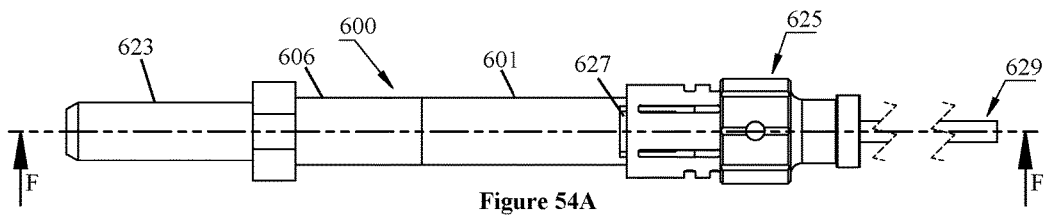
FIGS. 54A and 54B are a top view and a cross-sectional view along the line F-F of an embodiment of an assembly having an optical fiber and SC style fiber stub holder assembly, a splicing member, a guiding member, a clamping member, a cap, and the barrel member of FIG. 49.
Figure 54B:
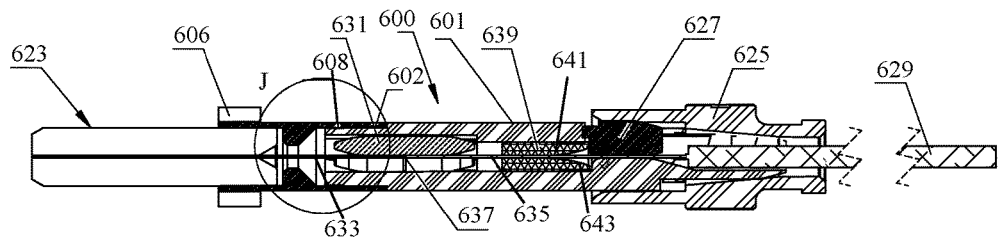

FIGS. 54A and 54B show an embodiment of an assembly 600 having barrel member 601, an optical fiber stub 623, and a cap 625. Optical fiber stub 623 is coupled to an optical fiber stub holder 606, which thereby couples barrel member 601. Cap 625 is coupled to a second end of barrel member 601, and is disposed over a clamping member 627. It is contemplated that cap 625 pushes down on clamping member 627 to thereby clamp a second optical fiber 635 of a second optical fiber cable 629. Second optical fiber cable 629 can be a 0.9 mm optical fiber cable. However, other optical fiber cables are contemplated (e.g., a 0.25 mm optical fiber cable, a 0.5 mm optical fiber cable, a 0.75 mm optical fiber cable, a 1.5 mm optical fiber cable, a 3 mm optical fiber cable, etc.).

Assembly 600 comprises a splicing member 631 disposed within barrel member 601. Splicing member 631 defines an aperture having dimensions that align ends of a first optical fiber 633 and second optical fiber 635 at a junction 637. In some embodiments, the ends of first optical fiber 633 and second optical fiber 635 are aligned within a radial tolerance of no more than 0.005 mm. Preferably, the ends of first optical fiber 633 and second optical fiber 635 are aligned within a radial tolerance of no more than 0.001 mm for a single mode fiber, and no more than 0.002 mm for a multimode fiber to minimize losses.

Assembly 600 comprises many of the same components as assembly 100. For example, assembly 600 comprises splicing member 631, a guiding member 639, clamping member 627, and cap 625, which are also shown in assembly 100. It should be appreciated that the features of each of those same components that are described in assembly 100 are applicable in assembly 600 (e.g., guiding member 639 comprises a tapered surface 643 and lumen 641, etc.).

Figure 55:
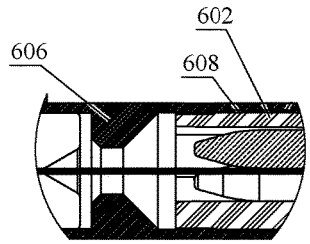
FIG. 55 is an enlarged view of area "J" of the assembly of FIG. 54B.

Once the ends of first optical fiber 633 and second optical fiber 635 are abutted in splicing member 631, second optical fiber 635 can be held in place within barrel member 601 to maintain their abutment. First optical fiber 633 extends from optical fiber stub 623, which is coupled to the first end of barrel member 601. Preferably, optical fiber stub holder 606 receives optical fiber stub 623 in a first end, and optical fiber stub holder 606 receives the first end of barrel member 601 on a second end. It is contemplated that an interior surface 608 of optical fiber stub holder 606 abuts an exterior surface 610 of barrel member 601 to provide an interference fit or press-fit with surface first reduced-diameter portion 602 as shown in FIG. 55. In some embodiments, optical fiber stub holder 606 can compress the first end of barrel member 601 to thereby clamp splicing member 637 and secure its position within barrel member 601. For example, optical fiber stub holder 606 can compress the first end of barrel member first reduced-diameter portion 602 to thereby cause a 3-rod bundle of splicing member 631 to abut one another and form aperture 617 for splicing first optical fiber 633 and second optical fiber 635.

Figure 5:
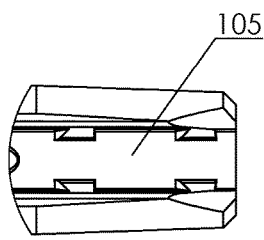
FIG. 5 is an enlarged view of area "B" of the barrel member of FIG. 1.
Figure 56:
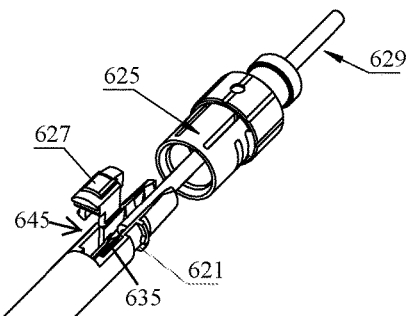
FIG. 56 is an exploded view of the assembly of FIGS. 54A-B.

It is contemplated that barrel member 601 can comprise a tapered recess 605 similar to that shown in FIG. 5 to hold second optical fiber cable 629 before second optical fiber 635 can be clamped in place to maintain a splice between first optical fiber 633 and second optical fiber 635. The clamp can comprise a clamping surface of barrel member 601 and a surface of clamping member 627 that press against second optical fiber 635. Barrel member 601 can comprise an opening 645 disposed above the clamping surface of barrel member 601 that is dimensioned to receive clamping member 627 as shown in FIG. 56.

Figure 57:
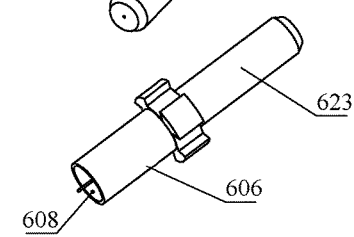
FIG. 57 is a perspective view of the optical fiber stub and optical fiber stub holder of FIGS. 54A-B.

FIG. 57 shows a perspective view of optical fiber stub holder 606 coupled with optical fiber stub 623. It is contemplated that optical fiber stub 623 can be removably coupled with optical fiber stub holder 606 to allow optical fiber stub 623 and/or optical fiber stub holder 606 to be replaced. However, in other embodiments, optical fiber stub 623 can be permanently affixed to optical fiber stub holder 606 or optical fiber stub 623 and optical fiber stub holder 606 can be a single, monolithic component.

It should be appreciated that assembly 600 can be used in SC connectors in the various configurations described above. For example, assembly 100 can be replaced by assembly 600 in SC connector 179 shown in FIGS. 14-16 or in other configurations using assembly 100 (e.g., SC connector 183). It should be appreciated that is the same for LC and other connectors. The optical fiber stub holder can be configured to fit various other connectors (e.g., LC and other connectors) typically with a slight modification of a first end of the barrel member to provide for a press fit.

Figure 58:
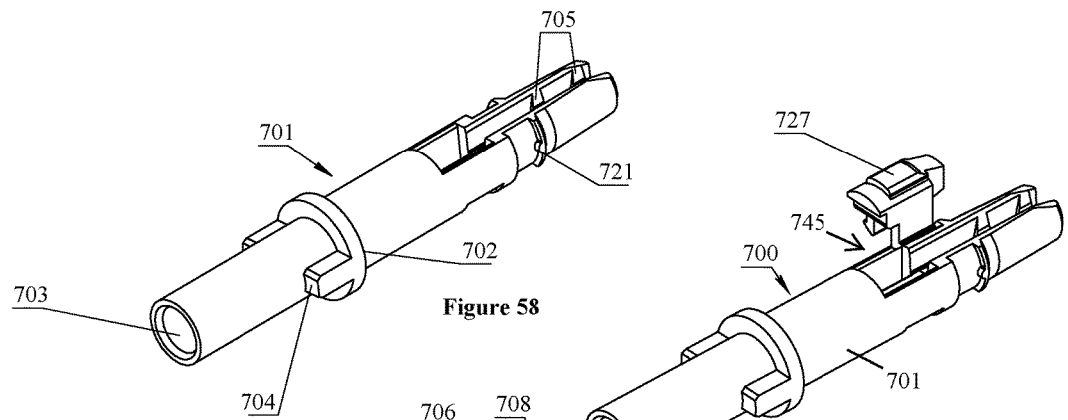
FIG. 58 is a perspective view of an embodiment of a barrel member.
Figure 59:
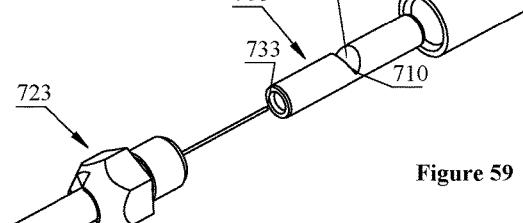
FIG. 59 is an exploded view of an embodiment of an assembly having a splicing member, a clamping member, an optical fiber stub and fiber stub holder, and the barrel member of FIG. 58.
Figure 60A:
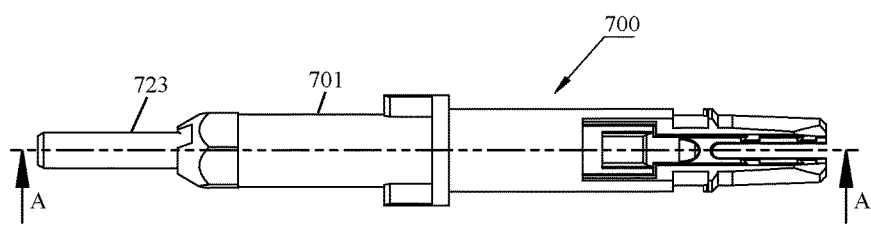
FIG. 60A is a top view of the assembly of FIG. 59.
Figure 60C:
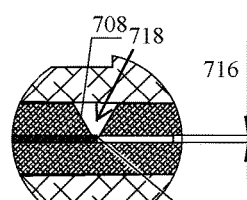
FIG. 60C is an enlarged view of area "N" of FIG. 60B of the assembly of FIG. 59.
Figure 60B:
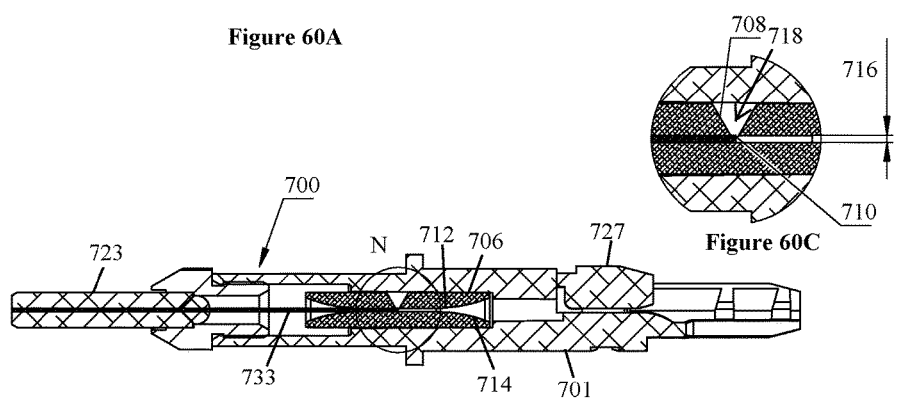
FIG. 60B is a cross-sectional view along the line A-A of FIG. 60A of the assembly of FIG. 59.

FIG. 58 shows another embodiment of a barrel member 701 for LC style field terminable connector that can also be used in an SC or other style field terminable connector. Barrel member 701 comprises a cavity 703, a projection 721, a tapered recess 705, a ridge 702, an LC connector optical fiber stub holder and ferrule assembly, and a projection 704 as described in barrel member 201. Thus, it is contemplated that the various features of each of these components as discussed in barrel member 201 are applicable to barrel member 701. FIG. 59 shows an exploded view of an assembly 700 having barrel member 701, and an assembled configuration is shown in FIGS. 60A-60B. Several components of assembly 700 are similar to those of assembly 100 and assembly 200. For example, assembly 700 comprises a clamping member 747, a projection 721, an optical fiber stub holder 723, and an opening 745. It is contemplated that the various features of each of these components discussed in assembly 100 and assembly 200 are applicable in assembly 700.

Assembly 700 further comprises a splicing member 706. Unlike the splicing member shown in the other embodiments (e.g., 3-rod bundle), splicing member 706 comprises a precise bored center hole 718, which can have the tolerance can be controlled within 0.0005 mm. Bored hole 718 can be used for fiber optic mechanical splice with a notch 708 located at a junction 710 to avoid air piston effect. It is contemplated that a first optical fiber and a second optical fiber can be spliced at junction 701 of splicing member 706. Splicing member 706 defines a lumen 712 having dimensions that guide a first optical fiber and a second optical fiber to splice at junction 710. As shown in FIG. 60B, at least a portion of lumen 712 has a tapered surface 714 to simplify the process of inserting a first optical fiber and a second optical fiber into lumen 712. Lumen 712 comprises a smallest diameter 716 that is within 25%, 15%, 10%, 5%, or 1% or preferably 0.002 mm maximum oversize of the diameter of a first optical fiber and/or a second optical fiber for multimode optical fiber and 0.001 mm oversize for single mode optical fiber. Splicing member 706 can comprise a notch 708 as shown in FIG. 60C, which allows air that enters lumen 712 as the first optical fiber and the second optical fiber are inserted into lumen 712 to escape. It should be appreciated that splicing member 706 can replace the splicing members used in any of the other embodiments (e.g., splicing member 131, splicing member 331, splicing member 437, etc.). Additionally, it is contemplated that splicing member 706 can replace both the splicing members and guiding members used in any of the other embodiments (e.g., splicing member 131 and guiding member 139, splicing member 331 and guiding member 339, etc.).

The various barrel members, guiding members, and splicing members described in the embodiments can be composed of the same or different materials. It is contemplated that at least one of the guiding members, the splicing members, and the barrel members can be a metal or ceramic. It should be appreciated that the various assemblies (barrel members, splicing members, guiding members, caps, clamping members, etc.) described above can be housed in SC or FC or ST or LC or any fiber optical style connectors. These various connectors can be sealed from the outside environment to prevent dust or moisture damage. Contemplated boots, backbones, caps, and sleeves are designed seal the connectors from the outside environment.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An assembly for splicing first and second bare optical fibers, comprising:
   a barrel member;
   a splicing member disposed within the barrel member, and defining an aperture having dimensions that align the ends of the first and second bare optical fibers at a junction; and
   a clamping member coupled with the barrel member, wherein a surface of the clamping member and a surface of the barrel member are configured to simultaneously press directly against and clamp the second bare optical fiber at a position distal from the junction.

2. The assembly of claim 1, wherein the splicing member further comprises an opened slot at the junction.

3. The assembly of claim 2, further comprising an optical fiber stub holder that is sized and dimensioned to couple with a first end of the barrel member via a press fit.

4. The assembly of claim 3, wherein the first bare optical fiber extends from an optical fiber stub, and wherein the optical fiber stub holder is sized and dimensioned to couple with the optical fiber stub via a press fit.

5. The assembly of claim 4, wherein the optical fiber stub holder is sized and dimensioned to couple with a first end of the splicing member via a press fit.

6. The assembly of claim 1, wherein the aperture is defined by a lumen of the splicing member having dimensions that guide the second bare optical fiber to the first bare optical fiber, and wherein the lumen of the splicing member is tapered.

7. The assembly of claim 1, further comprising an optical fiber stub holder that is sized and dimensioned to couple via press fit at least one of (i) a first end of the barrel member, (ii) the splicing member, and (iii) an optical fiber stub.

8. The assembly of claim 1, wherein the clamping member comprises a set of projections, and the barrel member comprises a recess, and wherein the set of projections are configured to directly contact an optical fiber jacket of the second bare optical fiber when the optical fiber jacket is disposed in the recess.

9. The assembly of claim 1, further comprising a cap having a cavity with dimensions to receive each of (a) at least a portion of the clamping member and (b) at least a portion the barrel member, and thereby biases the surface of the clamping member toward the surface of the barrel member to thereby clamp the second bare optical fiber.

10. The assembly of claim 9, wherein the cap comprises at least one of (i) a first slot that mates with a projection that extends from an exterior surface of the barrel member, and (ii) a second slot that mates with a rib on the clamping member.

11. The assembly of claim 1, wherein the clamping member is rotatably coupled with the barrel member, and wherein friction between the barrel member and the clamping member thereby allows the clamping member to be held in a desired position.

12. The assembly of claim 1, further comprising a guiding member disposed between the splicing member and the clamp, wherein the guiding member defines a lumen having dimensions that guide the second bare optical fiber to the splicing member.

13. The assembly of claim 1, wherein the barrel member comprises a tapered recess that is dimensioned to hold a portion of an optical fiber jacket of the second bare optical fiber and maintain abutment between the ends of the first and second bare optical fibers.

14. The assembly of claim 13, further comprising a clamping member rotatably coupled with the barrel member, and wherein the clamping member comprises a projection that extends over the tapered recess when the clamping member is in a closed position to thereby hold the portion of the optical fiber jacket in the tapered recess.

15. The assembly of claim 14, further comprising a connector backbone and compression spring that are sized and dimensioned to be placed onto a portion of the barrel member.

16. The assembly of claim 15, further comprising a crimp sleeve that is coupled to the connector backbone, and wherein a portion of the crimp sleeve is configured to be crimped over the optical fiber jacket of the second bare optical fiber.

17. The assembly of claim 1, wherein the aperture is defined by a first rod, a second rod, and a third rod that abut one another.

18. The assembly of claim 17, wherein the barrel member comprises at least one projection on an interior surface of the barrel member that abuts at least one of the first rod, the second rod, and the third rod.

19. The assembly of claim 1, further comprising a cap configured to slide over an end the barrel member and the clamping member, wherein the cap comprises (i) an interior wall that presses against a first portion of each of the barrel member and the clamping member when the cap is slid over the end of the barrel member and the clamping member to thereby clamp second bare optical fiber, and (ii) a tapered interior wall that presses against a second portion of each of the barrel member and the clamping member when the cap is slid over the end of the barrel member and the clamping member to thereby clamp the optical fiber jacket.

\* \* \* \* \*